(12) United States Patent
Froede et al.

(10) Patent No.: US 12,630,102 B2
(45) Date of Patent: May 19, 2026

(54) VEHICLE, METHOD AND CONTROL DEVICE FOR ACTIVATING A VEHICLE FUNCTION OF A VEHICLE

(71) Applicants:Bayerische Motoren Werke Aktiengesellschaft, Munich (DE); TECHNISCHE UNIVERSITÄT MÜNCHEN, Munich (DE)

(72) Inventors: Christian Froede, Munich (DE); Anton Renner, Munich (DE); Peter Forstner, Abensberg (DE); Joachim Froeschl, Herrsching (DE); Laurenz Tippe, Munich (DE)

(73) Assignees: Bayerische Motoren Werke Aktiengesellschaft, Munich (DE); TECHNISCHE UNIVERSITÄT MÜNCHEN, Munich (DE)

( * ) Notice: Subject to any disclaimer, the term of this patent is extended or adjusted under 35 U.S.C. 154(b) by 29 days.

(21) Appl. No.: 18/719,841

(22) PCT Filed: Nov. 24, 2022

(86) PCT No.: PCT/EP2022/083085
§ 371 (c)(1),
(2) Date: Jun. 14, 2024

(87) PCT Pub. No.: WO2023/110349
PCT Pub. Date: Jun. 22, 2023

(65) Prior Publication Data
US 2025/0042348 A1 Feb. 6, 2025

(30) Foreign Application Priority Data
Dec. 14, 2021 (DE) .......................... 102021133087.4

(51) Int. Cl.
B60R 16/023 (2006.01)
B60R 16/03 (2006.01)

(52) U.S. Cl.
CPC .......... B60R 16/0231 (2013.01); B60R 16/03 (2013.01)

(58) Field of Classification Search
CPC ... B60R 16/023; B60R 16/0231; B60R 16/02; B60R 16/03
See application file for complete search history.

(56) References Cited

U.S. PATENT DOCUMENTS 11,505,139 B2 * 11/2022 Kistler ................. B60W 50/00
2018/0086290 A1 * 3/2018 Makke ................... B60R 16/03
(Continued)

FOREIGN PATENT DOCUMENTS

DE        10100889 B4    11/2013
DE    102013208057 A1    11/2014
(Continued)

OTHER PUBLICATIONS

English translation of DE 102013208057 A1; date filed May 2, 2013; date published Nov. 6, 2014. (Year: 2014).*

*Primary Examiner* — Calvin Cheung
(74) *Attorney, Agent, or Firm* — 2SPL Patent Attorneys PartG mbB; Kieran O'Leary

(57) ABSTRACT

Embodiments of the present invention provide a method of activating a vehicle function of a vehicle. The vehicle comprises a plurality of energy paths and a plurality of energy consumers, with each energy path of the plurality of energy paths comprising at least one energy consumer of the plurality of energy consumers. The method comprises receiving a command to activate the vehicle function. The command to activate the vehicle function specifies an identifier of the vehicle function. The method further comprises, in response to the command to activate the vehicle function, (Continued)

determining an identifier of an energy path of the plurality of energy paths associated with the identifier of the vehicle function and selectively activating the energy path to provide electrical energy to at least one energy consumer of the plurality of energy consumers. The energy consumer is configured to perform the vehicle function.

10 Claims, 18 Drawing Sheets

(56) References Cited

U.S. PATENT DOCUMENTS

| | | |
|---|---|---|
| 2018/0295011 A1 | 10/2018 | Wang et al. |
| 2020/0331497 A1 | 10/2020 | Bohne et al. |

FOREIGN PATENT DOCUMENTS

| | | |
|---|---|---|
| DE | 102016220466 A1 | 4/2018 |
| DE | 102018008072 A1 | 4/2020 |

* cited by examiner

100 activating an energy path of the plurality of energy paths to provide electrical energy to at least one energy consumer of the plurality of energy consumers

110 receiving feedback from a control of the energy consumer, wherein the feedback specifies an identifier of the vehicle function

120

Registering the identifier of the vehicle function in a database

130

400

| | communication bus 1 | communication bus 2 | communication bus 3 | el. channel 1 | el. channel 2 | el. channel 3 | el. channel 4 |
|---|---|---|---|---|---|---|---|
| HW 1 | | | | X | | | |
| HW 2 | | | | | X | | |
| HW 3 | | | | | | X | |
| HW 4 | | | | | | | X |
| function 1 | X | | X | | | | |
| function 2 | X | X | | | | | |
| function 3 | | X | | | | X | |
| function 4 | | | X | | | | |
| function 5 | | | | X | | X | X |
| function 6 | | | | | X | | X |
| function 7 | | | | | | X | X |

Fig. 4

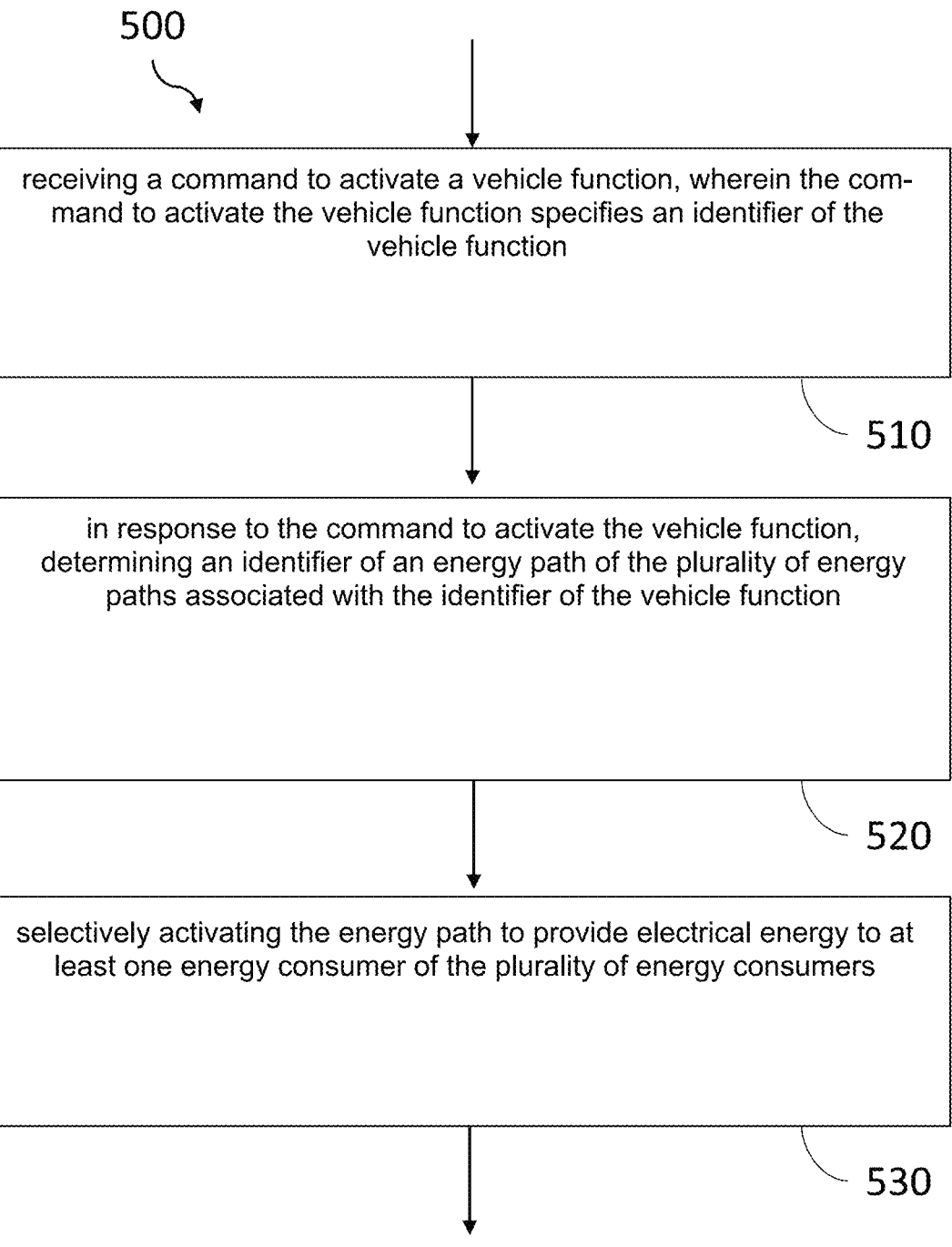

500 receiving a command to activate a vehicle function, wherein the command to activate the vehicle function specifies an identifier of the vehicle function

510 in response to the command to activate the vehicle function, determining an identifier of an energy path of the plurality of energy paths associated with the identifier of the vehicle function

520 selectively activating the energy path to provide electrical energy to at least one energy consumer of the plurality of energy consumers

1000 receiving status data of a vehicle function, wherein the status data specifies an identifier of the vehicle function, an identifier of at least one energy consumer and an identifier of an energy path

1010 checking the vehicle function by comparing the status data with a target state of the vehicle function

1020 sub-graph 1 = (customer function 1)

sub-graph 2 = (customer function 2)

sub-graph 12 = (customer function 1) (customer function 2)

sub-graph 1 = (customer function 1)

sub-graph 2 transition sub-graph 3 = (customer function 3)

communication status (TN) = red

1210

1200

1240

1242

1230 energy status (PSC) = blue interaction status (PWF) = green

1220

Figure 13-1:
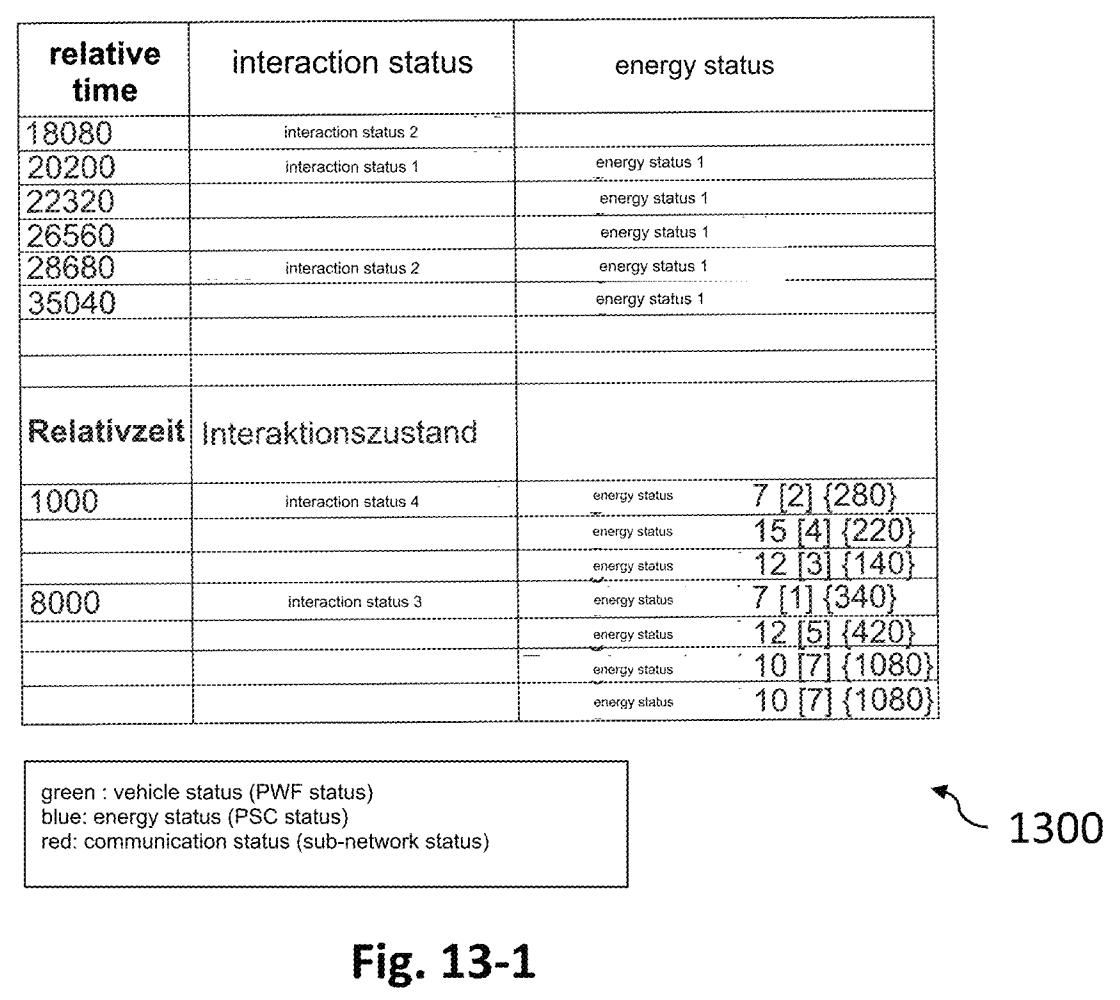

| relative time | interaction status | energy status |
|---|---|---|
| 18080 | interaction status 2 | |
| 20200 | interaction status 1 | energy status 1 |
| 22320 | | energy status 1 |
| 26560 | | energy status 1 |
| 28680 | interaction status 2 | energy status 1 |
| 35040 | | energy status 1 |
| | | |
| | | |
| Relativzeit | Interaktionszustand | |
| 1000 | interaction status 4 | energy status          7 [2] {280} |
| | | energy status          15 [4] {220} |
| | | energy status          12 [3] {140} |
| 8000 | interaction status 3 | energy status          7 [1] {340} |
| | | energy status          12 [5] {420} |
| | | energy status          10 [7] {1080} |
| | | energy status          10 [7] {1080} | green : vehicle status (PWF status)
blue: energy status (PSC status)
red: communication status (sub-network status)

| Communication status | Status Communication (ID) | Status Communication (Cause) ! = 0h | energy balance per PWF |
|---|---|---|---|
| communication status 3 | - | - | 0 |
| communication status 1 | - | - | |
| | | | |
| communication status 2 | ID 1 | Cause 1 | -3,5 |
| communication status 7 | ID 10 | Cause 10 | |
| communication status 7 and 4 | ID 4 | Cause 4 | -5 |

| Communication status [number] {total duration} | Status Communication (Ids) per TN | Status Communication (Causes) ! = 0h per TN | energy balance per PWF |
|---|---|---|---|
| 7 [2] {280} | - | - | |
| communication status　　15 [4] {220} | ID 2, ... | Cause 2, ... | |
| communication status　　12 [3] {140} | ID 5, ... | Cause 5, ... | 2 |
| communication status　　7 [1] {340} | ID 10, ID 3, ... | Cause 10, Cause 3, ... | |
| communication status　　12 [5] {420} | - | - | |
| communication status　　10 [7] {1080} | ID 7, ... | Cause 7, ... | 0 |
| communication status　　10 [7] {1080} | ID 7, ... | Cause 7, ... | 0 | green : vehicle status (PWF status)
blue: energy status (PSC status)
red: communication status (sub-network status)

VEHICLE, METHOD AND CONTROL DEVICE FOR ACTIVATING A VEHICLE FUNCTION OF A VEHICLE

CROSS-REFERENCE TO RELATED APPLICATIONS

This application is a 35 U.S.C. § 371 (c) national stage entry of PCT/EP2022/083085, filed on Dec. 24, 2022. That application claimed priority to German Application 10 2021 133 087.4 filed on Dec. 14, 2021. The contents of these earlier filed applications are incorporated by reference herein in their entirety.

FIELD

Embodiments of the present invention relate to a method and a control device for activating a vehicle function of a vehicle and to a vehicle.

Vehicle functions are implemented in a vehicle depending on the configuration of the vehicle. Each vehicle function requires an integration of specific energy consumers that may perform the vehicle function with the help of energy provided via energy paths.

BACKGROUND

Due to the increasing number of energy consumers and increased communication volume in the vehicle, an energy requirement and susceptibility to faults of the vehicle may increase.

Therefore, there may be a need to provide an improved activation of vehicle functions of a vehicle. Said demand is satisfied by the method, the control device and the vehicle of the independent claims.

SUMMARY

According to a first aspect of the present disclosure, there is provided a method of activating a vehicle function a vehicle. The vehicle comprises a plurality of energy paths and a plurality of energy consumers, with each energy path of the plurality of energy paths comprising at least one energy consumer of the plurality of energy consumers. The method comprises receiving a command to activate the vehicle function. The command to activate the vehicle function specifies an identifier of the vehicle function. The method further comprises, in response to the command to activate the vehicle function, determining an identifier of an energy path of the plurality of energy paths associated with the identifier of the vehicle function and selectively activating the energy path to provide electrical energy to at least one energy consumer of the plurality of energy consumers. The energy consumer is configured to perform the vehicle function.

According to a second aspect of the present disclosure, there is provided a control device for activating a vehicle function of a vehicle. The vehicle comprises a plurality of energy paths and a plurality of energy consumers, with each energy path of the plurality of energy paths comprising at least one energy consumer of the plurality of energy consumers. The control device comprises a control circuit that is configured to receive a command to activate the vehicle function. The command to activate the vehicle function specifies an identifier of the vehicle function. The control circuit is further configured to determine, in response to the command to activate the vehicle function, an identifier of an energy path of the plurality of energy paths associated with the identifier of the vehicle function and to selectively activate the energy path to provide electrical energy for at least one energy consumer of the plurality of energy consumers. The energy consumer is configured to perform the vehicle function.

According to a third aspect of the disclosure, there is provided a vehicle. The vehicle comprises a plurality of energy paths and a plurality of energy consumers, with each energy path of the plurality of energy paths comprising at least one energy consumer of the plurality of energy consumers. The vehicle further comprises a control device for activating a vehicle function of the vehicle. The control device comprises a control circuit that is configured to receive a command to activate the vehicle function. The command to activate the vehicle function specifies an identifier of the vehicle function. The control circuit is further configured to determine, in response to the command to activate the vehicle function, an identifier of an energy path of the plurality of energy paths associated with the identifier of the vehicle function and to selectively activate the energy path to provide electrical energy for at least one energy consumer of the plurality of energy consumers. The energy consumer is configured to perform the vehicle function.

According to a fourth aspect of the present disclosure, there is provided a non-transitory machine-readable storage medium having stored thereon a program comprising a program code for performing a method described herein when the program is executed on a processor or programmable hardware.

According to a fifth aspect of the present disclosure, there is provided a program having a program code for performing a method described herein, when the program is executed on a processor or a programmable hardware.

BRIEF DESCRIPTION OF THE FIGURES

Embodiments will be described in more detail below with reference to the accompanying figures, in which:

FIG. 4 is a tabular representation of an exemplary database with registered vehicle functions of a vehicle;

FIG. 5 illustrates a flowchart of an example of a method of activating a vehicle function of a vehicle;

FIG. 13 illustrates an example of a diagnostic matrix for checking a vehicle function of a vehicle.

DETAILED DESCRIPTION

Various embodiments will now be described more fully with reference to the accompanying drawings in which some embodiments are illustrated. In the figures, the thickness dimensions of lines, layers and/or regions may be exaggerated for clarity.

Figure 1:
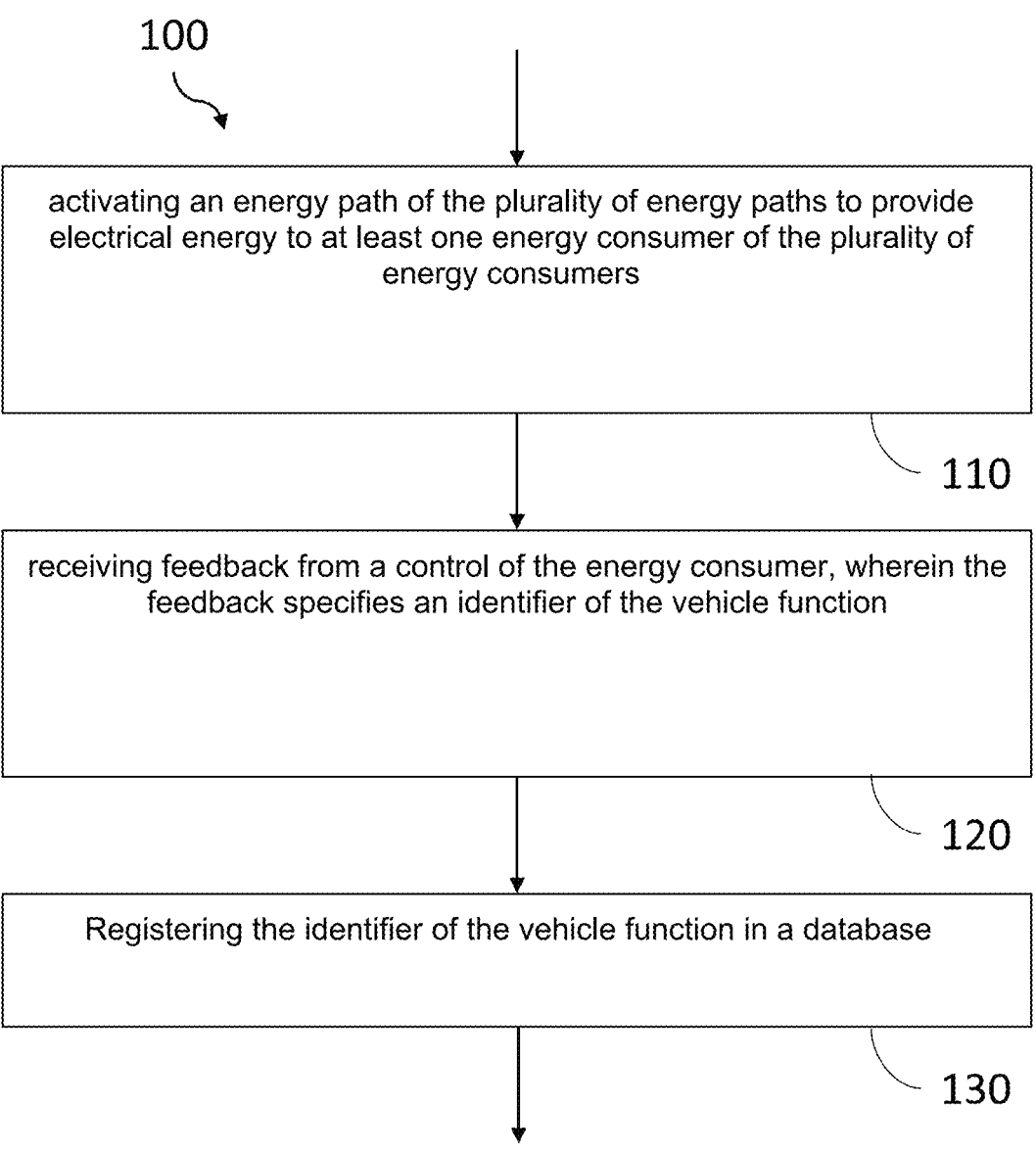
FIG. 1 illustrates a flowchart of an example of a method of registering a vehicle function of a vehicle.

FIG. 1 illustrates a flowchart of an example of a method 100 for registering a vehicle function of a vehicle. The method 100 may be performed by means of a suitable electronic circuit, such as a control device of the vehicle. For example, the control device may include a machine-readable storage medium having stored thereon a program comprising a program code that performs the method 100 when the program is executed on a processor or programmable hardware. In some embodiments, steps of the method 100 may be performed by multiple processors and/or in-vehicle/off-vehicle control devices.

The vehicle function may be any function intended for the vehicle, the execution of which requires at least one electrical energy consumer installed in the vehicle. For example, the vehicle function may be a comfort function, a driver assistance function, a safety function or an infotainment function. Examples of vehicle functions include air conditioning, heated seats, heated windows, vehicle dynamics control, door lock, interior lighting, navigation, automatic emergency braking, parking assistance, lane departure warning system, steering assistance, adaptive cruise control, lane departure warning, window operation and collision detection.

For the purposes of the present disclosure, it is assumed that multiple vehicle functions are integrated into the vehicle and that at least the vehicle function to be registered has an identifier which makes the vehicle function uniquely identifiable among the multiple vehicle functions. The vehicle function identifier may be identical for vehicles of the same type in which the vehicle function is integrated. The identifier may, for example, be associated with the vehicle function when the vehicle function is implemented into the vehicle and stored in a control device of the vehicle.

The vehicle functions may be distinguished from one another, for example, by means of the energy consumers required for them and/or an operating setting of the energy consumers. A vehicle function may be integrated into the vehicle, for example, when the vehicle is manufactured by implementing the energy consumers required for the vehicle function. The vehicle functions may be performed by activating the respective energy consumers. The execution of a vehicle function may require a simultaneous or sequential driving multiple energy consumers. The energy consumers may be intended to perform one or more vehicle functions.

For the purposes of the present disclosure, an energy consumer may be understood as any at least partially electrically operated unit for performing one of the vehicle functions of the vehicle. An energy consumer may be, for example, a sensor, a control device, an actuator, a timer, a gateway, a display element, a lighting element, a current distributor, a gateway, a user interface, a backend interface or an electric motor.

For the method 100, it should be assumed that said vehicle comprises a plurality of energy paths and a plurality of energy consumers. Each energy path of the plurality of energy paths comprises at least one energy consumer of the plurality of energy consumers. Such a vehicle may be any system for the transportation of persons or goods, comprising a chassis driven by an engine. In particular, the vehicle may be a car, a truck, a motorcycle, or a tractor.

The energy paths may be understood as load paths of an on-board network of the vehicle. The energy paths may be any system for providing electrical energy to at least one energy consumer of the plurality of energy consumers. For this purpose, the energy paths may conduct the electrical energy from an electrical energy source in the vehicle, for example a battery, to the energy consumer. The energy paths may, for example, be electrical conductors of any type that connect the energy source to the energy consumer.

Taken together, the energy paths of the on-board network may form an energy network of the vehicle. The on-board network may preferably be designed in such a way that a significant part of the energy paths (approximately over 30% of the energy paths) is switchable. For example, an energy path may be switchable via a controllable switching element, such as a semiconductor switching element or a relay. The on-board network of the vehicle may comprise one or more current distributors that may drive one or more switching elements. The current distributor may open a switching element of an energy path in order to disconnect a connected energy consumer from the energy provision through the energy path. In this open state, the energy path may be described as deactivated and/or the opening of the switching element may be described as deactivating the energy path. The current distributor may close the switching element in order to establish the power provision: This may be described as activating the energy path. Such a switching element and such a current distributor may be provided in the vehicle to protect the energy paths against excessive currents, for example, and may also be used to register the vehicle function for the execution of the method 100.

A central control device of the vehicle may, for example, transmit a command to activate or deactivate an energy path to the current distributor via a communication technology coupling. In addition to the energy supply network, the on-board network may also include a communication network. The communication network may be understood as the entirety of communication paths between multiple communication nodes. Communication paths may, for example, establish a data communication between energy consumers (or their higher-level controls), control devices of the vehicle and/or the current distributors. A communication path may be any system for the wired or wireless transmission of data between the communication nodes. Such a communication path may be a data bus, for example a CAN (control Area Network), CAN-FD (Flexible Data), FlexRay, Ethernet, K, LIN (Local Interconnect Network) and MOST (Media Oriented System Transport) bus.

For example, if a certain vehicle function is to be retrieved that requires a certain energy consumer to be activated, the control device may drive a current distributor, which then activates an energy path to the energy consumer. For this purpose, there may be a fixed association of the energy consumer with the vehicle function and with the energy path to the energy consumer. Such an association may be made when the vehicle is manufactured or when the vehicle function is implemented. For example, the energy consumer and the energy path may be made clearly identifiable by means of an identifier. The identifier of the energy consumer and the identifier of the energy path may be stored in the control device and linked to an identifier of the vehicle function. If the vehicle function is to be retrieved, the control device may receive an activation command with the identifier of the vehicle function. The control device may then retrieve the identifier of the energy consumer and of the energy path linked to the identifier of the vehicle function and use the same to activate the energy path according to the linked identifier and thus the energy consumer to perform the vehicle function.

Assuming a large number of energy paths, energy consumers and vehicle functions and a complex functional link as well as a vehicle-specific design of the energy paths, energy consumers and vehicle functions, a central registration and automatically retrievable list of vehicle functions implemented in a specific vehicle may be advantageous, whether for diagnostic purposes or to determine a range of functions of the vehicle.

Updating such a registration may also be advantageous after the vehicle has been commissioned—for example, if an actual range of functions of the vehicle is to be determined without knowledge of a functional scope defined when the vehicle is commissioned, for example during maintenance, sale, identification or software update of the vehicle. In addition, such an updated registration may be advantageous if one assumes that vehicle functions are implemented subsequently (after the commissioning) via software updates or retrofitting, i.e., that the range of the vehicle's functions often changes.

One task of the present disclosure may be a simple determination of vehicle-specific vehicle functions integrated into a vehicle.

Referring back to FIG. 1: The method 100 comprises activating 110 an energy path of the plurality of energy paths to provide electrical energy to at least one energy consumer of the plurality of energy consumers, wherein the energy consumer is configured to perform the vehicle function.

Activating 110 the energy path nay, for example, be performed in response to a command to register vehicle functions of the vehicle. Activating 110 the energy path may comprise systematically selecting the energy path from the plurality of energy paths. For example, multiple energy paths of the plurality of energy paths may be selected and activated consecutively. In preferred embodiments, the method 100 is carried out consecutively for each (activatable) energy path of the plurality of energy paths in order to enable systematic capture of vehicle functions functionally related to the activated energy path. The method 100 may be performed for one energy path, for example, before a next energy path of the plurality of energy paths is selected and activated. The order in which the energy paths are selected may be arbitrary. Since some energy paths of the plurality of energy paths may not be activatable under certain circumstances, for example because they are permanently activated to ensure system safety of the vehicle, such non-activatable energy paths should be disregarded when performing step 110 of method 100.

In some embodiments, the method 100 comprises determining whether at least one further (activatable) energy path of the plurality of energy paths is activated. If it is determined that the further energy path is activated, the method 100 comprises deactivating the further energy path to interrupt a provision of electrical energy to a further energy consumer of the plurality of energy consumers. Activating 110 the energy path takes place in said embodiments, while the other energy path is deactivated. Optionally, the energy path is activated 110 while no other (activatable) energy path of the plurality of energy paths is activated. This may enable consecutive activation of all (activatable) energy paths and thus a fault-free and systematic association of vehicle functions with the functionally related energy paths. It should be noted that, for the consecutive activation of each (activatable) energy path, it is necessary that the system performing the method 100 is networked with each energy path in terms of energy and/or data.

As explained above, activating 110 the energy path may include driving a current distributor connected to the energy path. Activating 110 the energy path ma comprise a conductive switching of a switching element connected to the energy path. Activating 110 the energy path may include setting a specific operating current flowing through the energy path. The latter may also be the case, for example, if no switching element is intended with regard to the energy path and the energy consumer connected to the energy path is continuously supplied with electrical energy, at least in the form of a standby mode. A standby mode may then be understood as a deactivated state of the respective energy path and operation with the operating current as an active state.

Referring back to FIG. 1: The method 100 further comprises receiving 120 feedback from a control of the energy consumer, wherein the feedback indicates an identifier of the vehicle function.

The control of the energy consumer may be any system for transmitting the feedback to a system performing the method 100. The control of the energy consumer may be, for example, a control device that is higher-level than the energy consumer or a control integrated into the energy consumer. The control of the energy consumer may, for example, be configured to transmit the feedback in response to activating 110 the energy path. The feedback may include machine-readable data indicative of the vehicle function identifier.

The control of the energy consumer may, for example, have access to a data storage in which an association of the energy path with the identifier of the vehicle function is stored. This association may have been defined when the vehicle function was implemented, for example, and may serve to correctly drive an energy path to be activated for this purpose when the vehicle function is performed. In the reverse case here, where the energy path is activated without prior knowledge of which vehicle function (or which vehicle functions) it is associated with, the same association may be used to register vehicle functions of the vehicle.

Receiving 120 the feedback may be accomplished via a communication path between the energy consumer control and the system performing the method 100.

Referring back to FIG. 1: The method 100 further comprises registering 130 the vehicle function identifier in a database.

The database may be any system for storing data. The database may include a data management program that stores the data on a data storage.

Registering 130 the vehicle function identifier may include, for example, determining whether the vehicle function identifier is already stored in the database. For this purpose, a system performing the method 100 may send a data query to the database. If it is determined that the vehicle function identifier is not stored in the database, registering 130 the vehicle function identifier may include storing the vehicle function identifier in the data storage. Similarly, the method 100 may optionally comprise registering a respective identifier for each vehicle function of a plurality of vehicle functions of the vehicle.

The method 100 may thus comprise, when the data storage is read out, an indication of whether the vehicle function is implemented in the vehicle. When performing the method 100 for multiple energy paths of the plurality of energy paths, the method 100 may provide a registration of multiple or all implemented vehicle functions of the vehicle. This may be advantageous for functional diagnostics or for identifying a range of functions of the vehicle.

In addition, the method 100 may comprise creating a data set for the vehicle function or a respective data set for all captured vehicle functions in the database. The data set may contain further information relevant to the execution of the vehicle function. For example, the method 100 may comprise associating an identifier of the energy path with the identifier of the vehicle function in the database. In some embodiments, the feedback from the control of the energy consumer further indicates an identifier of the energy consumer and/or an identifier of the control. In said embodiments, registering 130 the identifier of the vehicle function may comprise associating the identifier of the energy consumer and/or the identifier of the control with the identifier of the vehicle function in the database.

Thus, information on energy paths, energy consumers and/or controls relevant to the execution of the vehicle function may be stored in the data set. Such a data set may be described as an "address chain", as it concatenates the identifiers (addresses) of vehicle components and systems relevant to the vehicle function in terms of data technology. An example of an address chain is explained with reference to FIG. 2.

The address chain may also contain other information relevant to the execution of the vehicle function. For example, the feedback from the energy consumer's control may also indicate (operating) parameters of the energy consumer. To drive the energy paths and the energy consumers, such parameters are usually stored in the corresponding current distributors and/or controls. The parameters may include a supply type of the energy consumer (e.g., energy supply to be provided for communication only, for communication and sensors or for communication, sensors and actuators of the energy consumer), an energy requirement of the energy consumer (e.g., standby energy requirement, rated power), an operating current of the energy consumer (e.g., minimum value, maximum value of the operating current), a time behavior of the energy consumer (e.g., necessary shut-down delay when deactivating the vehicle function, sequence of a start-up of the energy consumer, necessary operating duration of the energy consumer to perform the vehicle function) and a overrun behavior of the energy consumer (e.g., sequence of a shut-down of the energy consumer, storage location and processing sequence when storing sensor data captured by the energy consumer or measurement data on the actual energy consumption of the energy consumer). Registering 130 the vehicle function identifier may therefore involve associating the parameters with the vehicle function identifier in the database.

The address chain of a vehicle function may be extended during consecutive execution of the method 100, provided that the respective feedback includes further information not yet stored in the address chain.

In some embodiments, the method 100 may comprise registering an identifier of another vehicle function of a plurality of vehicle functions of the vehicle in the database. To do this, steps 110 to 130 may be performed for the other vehicle function.

If the above-mentioned vehicle function differs only slightly from the other vehicle function in the energy consumers associated with it, their address chains may be merged to simplify the database. In other words: If a majority of energy consumers required to perform the above-mentioned vehicle function are also required to perform the other vehicle function, it may be possible to reduce the number of entries in the database. The method 100 may comprise, for example, determining at least one energy consumer of the plurality of energy consumers, the identifier of which is associated either with the identifier of the vehicle function or with the identifier of the further vehicle function. If the address chains are used to activate vehicle functions, merging the address chains may lead to energy consumers also being activated for vehicle functions for which they are not needed. However, if these energy consumers only have a low energy requirement, merging them may still be justified. The method 100 may thus comprise determining whether an energy requirement of the energy consumer exceeds a threshold value. And if it is determined that the energy requirement does not exceed the threshold value, the method 100 may further comprise associating the identifier of the further vehicle function with the identifier of the vehicle function, i.e., merging the address chains.

The method 100 may enable an address chain to be associated with a vehicle function in a system network. The address chain may be "learned" (registered) at the time of vehicle production, for example, or if necessary, also during servicing for repairs or upgrades. A system network may represent an energy-related and data-related network of multiple systems, for example of multiple functions in a control device, a smart sensor or smart actuator, in a backend server or mobile device and/or a networking unit such as a gateway for communication or in a current distributor for the energy supply.

The method 100 may enable automated registration of a vehicle function (or all vehicle functions). The process may enable learning of the vehicle subsystems (energy consumers and energy paths) to be activated in each case and required for the vehicle functions and thus learning of the above-mentioned address chains.

Registration, i.e., learning the list of address chains, may take place during initial commissioning, e.g., at the end of vehicle production, or by means of triggering by a service tester, e.g., after repair or upgrade in a workshop. The entirety of all address chains may be described as a "registry". With the help of the registry, the address chain of a vehicle function may provide activation information of systems necessary for a fulfillment of function of the vehicle function. The necessary systems may be activated by management systems for energy and communication. In other words, the registry may act as a kind of database for the vehicle's control instances.

The registry may be stored and managed by a selected central control device, a current distributor or a gateway module of the vehicle. For safety reasons, a reserve system may be intended that may alternatively take over storage and management in the event of redundancy or faults. Alternatively, the reserve system may also be located outside the vehicle, e.g., in a backend server, and regularly synchronize with the vehicle.

In addition, a communication path (or multiple/all communication paths) of a communication network of the vehicle may also be used in a similar manner as in step 110 for the energy paths. The method 100 may comprise, for example, activating the communication path. In this case, activating may be understood as addressing a control of an energy consumer via the communication path. The control of the energy consumer may then send feedback indicative of a vehicle function that may be drivable via the communication path. The feedback may, for example, specify an identifier of the communication path, an identifier of the vehicle function and/or an identifier of the energy consumer. This allows information on network communication with the energy consumers relevant to the execution of the vehicle function to be collected and to be associated with the data set of the vehicle function.

In some embodiments, the method 100 further comprises activating a communication path of the vehicle to provide network communication with at least one further energy consumer of the plurality of energy consumers. The additional energy consumer is configured to perform the vehicle function of the vehicle. The method 100 may further comprise receiving feedback via the network communication, wherein the feedback indicates the vehicle function identifier and a communication path identifier. The method 100 may further comprise associating the communication path identifier with the vehicle function identifier. This may be advantageous, for example, if the other energy consumer is continuously supplied and does not have a switchable energy path. By addressing the communication path, information on such continuously supplied energy consumers and on a communication technology link to the other energy consumers may also be associated with the data set of the vehicle function.

Figure 2:
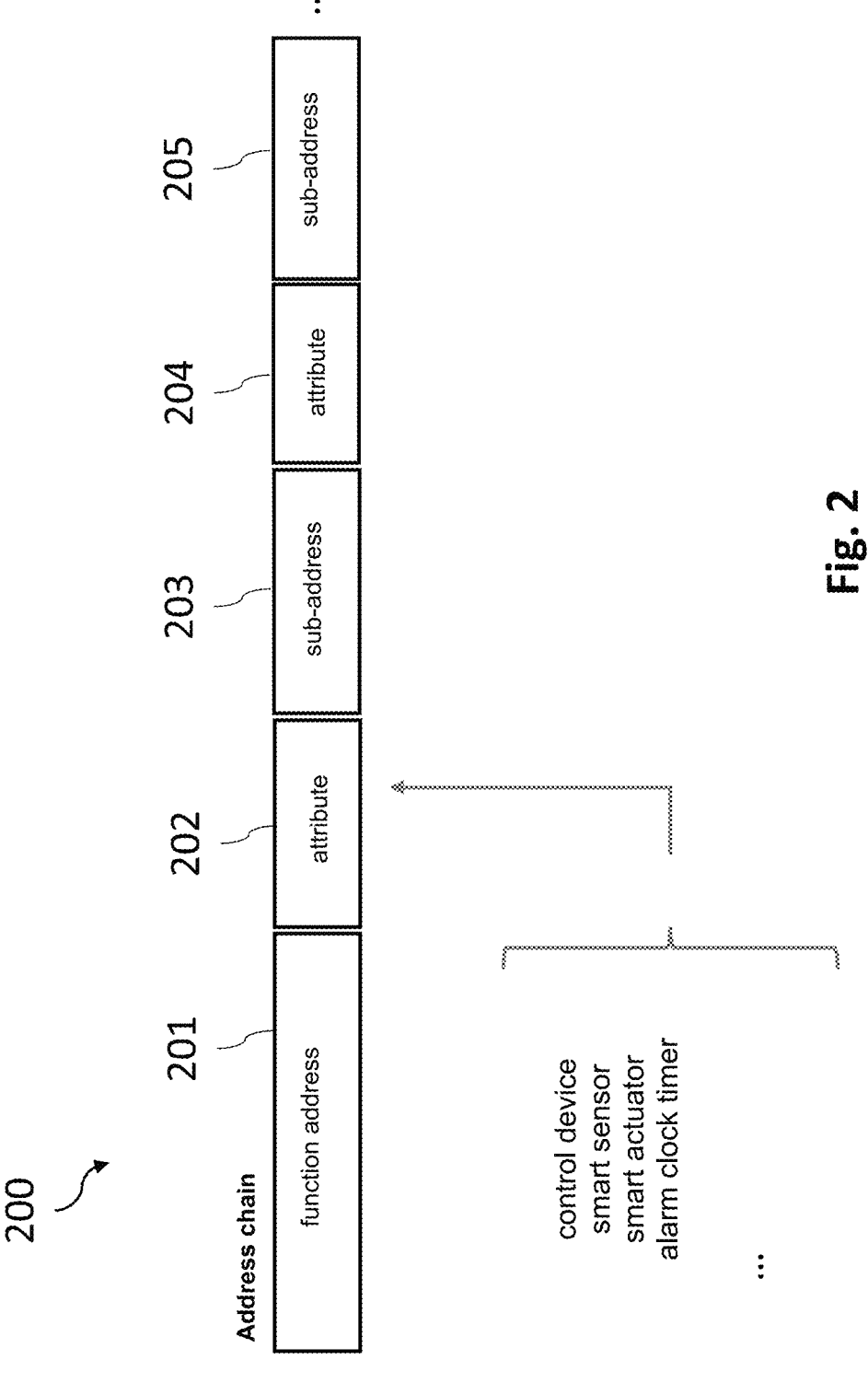
FIG. 2 is a schematic representation of an exemplary data set of a registered vehicle function.

FIG. 2 shows a schematic representation of an exemplary data set 200 ("address chain") of a registered vehicle function in a database. The representation of the data set 200 shown in FIG. 2 may be understood as a meta-level of a data structure (of a setup) of the data set 200.

The identifier of the vehicle function ("function address") is stored in a first data field 201 of the data set 200. The identifier may be any character sequence that uniquely identifies the vehicle function and is stored in a data storage, for example as a digitally coded numerical value. Further data fields 202 to 205 are linked to the first data field 201 in terms of data. In the other data fields 202 to 205, a designation ("attribute") and an identifier ("sub-address") of energy consumers required to perform the vehicle function are stored. In FIG. 2, the control device, smart sensor, smart actuator and wake-up timer are given as examples of energy consumers.

The data set 200 may be configured dynamically (learning, adaptation), i.e., by re-registering the vehicle function, changed settings of the vehicle function since the previous registration may be included in the data set 200.

Figure 3:
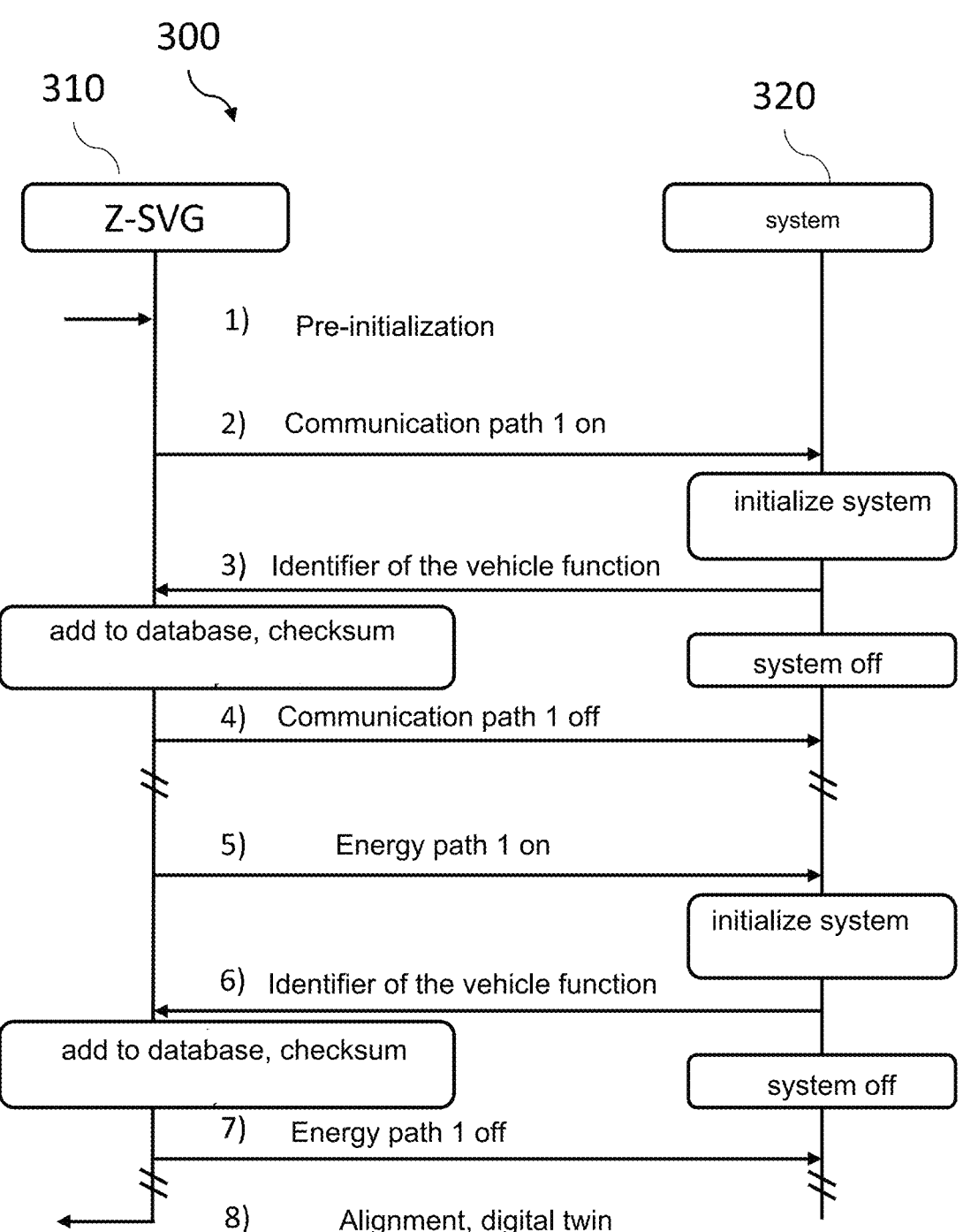
FIG. 3 illustrates a flowchart of another example of a method of registering a vehicle function of a vehicle.

FIG. 3 illustrates a flowchart of a further example of a method 300 for registering a vehicle function of a vehicle.

An apparatus 310 performing the method 300 is communicatively connected via a communication path to at least one energy consumer 320 ("system") intended for performing the vehicle function, for example via a data bus system. An exchange of information via the communication path is illustrated in FIG. 3 using signal flow arrows. It should be noted that a signal flow (a network communication) between the apparatus 310 and the energy consumer 320 may also take place indirectly via other communication nodes of the vehicle, such as one or more gateways. In addition, the network communication shown in FIG. 3 may also take place between a control of the energy consumer 320 and the apparatus 310. The at least one energy consumer 320 shown schematically as a block in FIG. 3 may comprise multiple energy consumers, wherein multiple communication paths or a respective communication path may be intended for a network communication between the apparatus 310 and the multiple energy consumers.

The apparatus 310 (referred to as "Z-SVG" in FIG. 3) may be a central control device, a current distributor or a gateway module, for example.

In a first step 1), the apparatus 310 receives a command to register the vehicle function ("registry pre-init schedule"). Step 1) may be regarded as a pre-initialization of the method 300. In step 1), the apparatus 310 may optionally check whether all switchable energy paths and/or communication paths of the vehicle are deactivated and, if necessary, deactivate any energy paths and/or communication paths that are still active. In step 1), the apparatus 310 may further determine an order by which energy paths/communication paths are to be selected from a plurality of energy paths/communication paths of the vehicle to perform subsequent steps. Step 1) is a pre-initialization of the registration.

In a second step 2), the apparatus 310 switches on a communication path 1 (communication channel). The apparatus 310 activates a CAN data bus 1 with a "Communication 1 on" command, for example.

In response to the activation of the communication path 1, the control of the energy consumer 320 connected to the communication path 1 performs an initialization of the energy consumer 320. If the control is a higher-level control device for multiple energy consumers, the control initializes all energy consumers to be controlled by it, for example.

Once initialization is complete, in a third step 3) the control sends feedback to the apparatus 310 via the communication path 1 ("Communication 1 system send func address"). Here, the control transmits its locally stored identifiers of vehicle functions. The feedback indicates that the control is intended to perform these vehicle functions.

The apparatus 310 then adds the identifiers of the vehicle functions to the database as a data set ("add to registry"). Optionally, the apparatus 310 may use a fault recognition method ("checksum") to check whether a transmission error has occurred when receiving the feedback. For example, row/column checksums, parity bits or error-correcting coding may be provided in the database. If a transmission error is detected, the apparatus may repeat steps 2) and 3) for communication path 1.

In a fourth step 4), the apparatus 310 deactivates the communication path 1 ("Communication 1 off"). The control then shuts down the energy consumers 320 again.

Steps 2) to 4) may be repeated for all communication paths implemented in the vehicle's gateways. This allows the apparatus 310 to register all vehicle functions accessible via the communication paths in the database.

In a fifth step 5), the apparatus 310 activates an energy path 1 ("Channel 1 energy on"). This step 5) is applicable for energy consumers that are not continuously supplied and therefore have to be supplied individually with electrical energy. The energy path 1 may be switched on, for example, by driving an efuse ("energy on") and is subject to a specific order, e.g., prioritized switching on of central nodes of the on-board network.

In response to the activation of the energy path 1, the control performs initialization of the energy consumers 320 connected to the energy path 1.

In a sixth step 6), the control reports back to the apparatus 310 via a communication path (data channel) and transmits locally stored function addresses. ("Channel 1 send func address").

The apparatus 310 then adds the identifiers of the vehicle functions to the database as a data set ("add to registry"). The apparatus 310 may store the identifiers of the vehicle functions with an association with the energy path identifier in the database.

In a seventh step 7), the apparatus 310 switches off the energy path 1 ("energy off").

Steps 5) to 7) may be repeated for all energy paths of the vehicle. The apparatus 310 may therefore register all vehicle functions activatable via the energy paths in the database.

Optionally, in an eighth step 8), the apparatus 310 may align the database with a digital twin of the vehicle functions ("alignment, create digital twin"), for example after a repair or an upgrade of the vehicle.

FIG. 4 shows a tabular representation of an exemplary database 400 with registered vehicle functions of a vehicle. The database 400 associated communication paths (here: communication bus 1, communication bus 2 and communication bus 3) and energy paths (here: el. (electrical) channel 1, el. channel 2 and el. channel 3) of the vehicle with the corresponding energy consumers (HW1 (hardware) to HW4) and vehicle functions (function 1 to function 7).

Here, communication bus 1 is associated with functions 1 and 2. This means that communication bus 1 "operates" functions 1 and 2. HW 4 (such as a control device) is associated with the electrical channel 4 and thus with functions 5, 6 and 7. If function 1 is activated in the example shown in FIG. 4, data bus 1 and 3 are activated. A corresponding address chain for function 1 may be as follows: Address chain (function 1)=[1; data bus 1, function node 1; data bus 3, function node 3]

If function 3 is activated in the example shown in FIG. 4, the data bus 2 and the electrical channel 3 (HW 3; control device) are activated. The corresponding address chain for function 2 may be as follows:

Address chain (function 3)=[3; data bus2, function node2; el. channel3, control device/HW3]

Thus, when a vehicle function is activated, for example by a vehicle user in or on the vehicle, the address chain may be used to activate the energy consumers required to fulfill the function.

Further embodiments relate to a control device for registering a vehicle function of a vehicle, wherein the vehicle comprises a plurality of energy paths and a plurality of energy consumers. For example, the control device may be configured to perform a method of registering the vehicle function, such as method 100 or method 300. The control device comprises a control circuit configured to activate an energy path of the plurality of energy paths for providing electrical energy to at least one energy consumer of the plurality of energy consumers, wherein the energy consumer is configured to perform the vehicle function. The control circuit is further configured to receive feedback from a control of the energy consumer, with the feedback indicating an identifier of the vehicle function. The control circuit is further configured to register the identifier of the vehicle function in a database.

Further embodiments relate to a vehicle comprising a plurality of energy paths, a plurality of energy consumers and the above-mentioned control device for registering a vehicle function of the vehicle.

Further details and aspects of the control device or vehicle according to the invention are explained in connection with the proposed technology or one or more examples described above, e.g., with reference to FIG. 1. The control device or the vehicle may comprise one or more additional optional features corresponding to one or more aspects of the proposed technique or one or more examples described above.

In summary, a technique for registering a vehicle function of a vehicle is proposed. This technology may be used to easily, and even upon commissioning of the vehicle, determine whether said vehicle function or, more generally, which vehicle functions are implemented in the vehicle. In addition, the technology may systematically determine a communication and/or energy networking of systems (energy consumers) intended for the vehicle functions and store them in address chains. The address chains may be used, for example, to activate a vehicle function, as explained with reference to FIG. 5, or to check a vehicle function, as explained with reference to FIG. 10.

FIG. 5 illustrates a flowchart of an example of a method 500 of activating a vehicle function of a vehicle. The method 500 may be performed by means of a suitable electronic circuit. The method 500 may be performed by a control device of the vehicle. For example, the control device may include a machine-readable storage medium having stored thereon a program comprising a program code that performs the method 500 when the program is executed on a processor or programmable hardware. In some embodiments, steps of the method 500 may be performed by multiple processors and/or in-vehicle/off-vehicle control devices.

As described above, the vehicle comprises a plurality of energy paths and a plurality of energy consumers, with each energy path of the plurality of energy paths comprising at least one energy consumer of the plurality of energy consumers.

The method 500 comprises receiving 510 a command to activate the vehicle function. Here, the command to activate the vehicle function indicates an identifier of the vehicle function. The command to activate the vehicle function may be interpreted as a machine-readable signal that encodes the identifier of the vehicle function.

Receiving 510 the command may be triggered, for example, by a function request from a user of the vehicle. In this case, a control device performing the method 500 may receive the command from a user interface. The user may select the vehicle function, for example, by operating the user interface, such as a physical operating unit of the vehicle. The user interface may recognize a user selection, retrieve the vehicle function identifier based on the selection, create the command and transmit it to the control device.

Alternatively, receiving 510 the command may be triggered by an in-vehicle function request. For example, a program may run in a (different) control device of the vehicle which, if certain conditions defined in a program code are met, creates the command and transmits it to the control device performing the method 500. For example, the control device may query the current time from a timer in regular cycles and trigger the function request at a specific time.

The command 510 to activate the vehicle function may be received, for example, via an in-vehicle communication network that connects a user interface or a control device triggering the function request with the control device performing the method 500, for example via a data bus system, in terms of communication technology.

The method 500 further comprises, in response to the command to activate the vehicle function, determining 520 an identifier of at least one energy path of the plurality of energy paths associated with the identifier of the vehicle function. For example, the control device performing the method 500 may determine the energy path identifier after a predefined time after receiving 510 the command. The control device may include a processing circuit to process the command to activate the vehicle function and perform the determining 520 of the energy path identifier approximately as fast as a processing speed of the processing circuit allows.

To determine 520 the identifier, the control device may, for example, access a data storage that stores an association of the vehicle function identifier with the energy path identifier, for example in the form of a lookup table. This association may indicate that the energy path is to be activated for the vehicle function to be performed. The association may have been captured by registering the vehicle function, for example by the method 100, and stored in a database. The association may be an address chain of the vehicle function.

Referring back to FIG. 5: The method 500 further comprises selectively activating 530 the energy path to provide electrical energy to at least one energy consumer of the plurality of energy consumers. The energy consumer is configured to perform the vehicle function.

Selectively activating 520 the energy path comprises, for example, selecting the energy path according to the identifier of the energy path. A control device performing the method 500 may, for example, drive a current distributor and transmit the energy path identifier to the same. The current distributor may be electrically connected to multiple switching elements by means of which the current distributor may activate (or deactivate) energy paths. By means of a fixed association of the energy path identifier with one of the switching elements, the current distributor may determine the switching element for the energy path and switch the same in order to activate the energy path.

The identifier of the energy path is indicative of a current distributor connected to the energy path. The selective activation 530 of the energy path may comprise driving the current distributor. For example, a control device performing the method 500 may be connected to multiple current distributors of the vehicle in terms of communication technology and select the required current distributor by means of the energy path identifier. The control device may then transmit the energy path identifier to the current distributor in order to activate the energy path.

Selective activation 530 of energy paths should be understood to mean that at most or only the energy paths associated with the vehicle function are activated on the basis of the command to activate the vehicle function. The energy paths associated with the vehicle function may (at least mainly) be those energy paths that are necessarily be activated to perform the vehicle function, as they provide energy to energy consumers to perform the vehicle function. The selective activation 530 of the energy path may therefore exclude the activation of energy paths not associated with the vehicle function.

In the event that multiple energy paths are associated with the vehicle function in the above-mentioned database, the method 500 may comprise determining an identifier of a further energy path of the plurality of energy paths associated with the identifier of the vehicle function. In particular, the method 500 may comprise determining all energy path identifiers associated with the vehicle function identifier. The method 500 may comprise, in response to the command to activate the vehicle function, selectively activating the further energy path to provide electrical energy to at least one further energy consumer of the plurality of energy consumers, wherein the further energy consumer is also configured to perform the vehicle function. This may be necessary if multiple energy consumers, which are supplied by different energy paths, are provided for the execution of the vehicle function.

If the energy path associated with the vehicle function is already activated, selectively activating 530 the energy path may include maintaining the active state of the energy path. To this end, the method 500 may include determining whether the energy path is active based on network communication with a current distributor. If it is determined that the energy path is not active, the method 500 may perform the selective activation 530 of the energy path. The network communication may take place via a communication path of which the identifier may also be associated with the vehicle function in the address chain.

In some embodiments, the method 500 comprises receiving an identifier of a communication path of the vehicle associated with the identifier of the vehicle function. Receiving the identifier of the communication path may indicate that an energy consumer connected to the communication path in terms of communication is to be driven for the execution of the vehicle function. Further, the method 500, in response to the command to activate the vehicle function, may comprise sending a command to perform the vehicle function to a control of another energy consumer of the plurality of energy consumers connected to the communication path. This may be particularly advantageous for driving continuously supplied energy consumers and/or energy consumers that are not activatable via an energy path.

With the aid of the method 500, all energy consumers required to perform the vehicle function may be driven in terms of communication (via communication paths) and/or energy (via energy paths) in order to activate the vehicle function.

Based on an association of vehicle functions with energy paths and optionally with energy consumers (systems) or communication paths in a database (registry), the method 500 may enable selective activation of only those energy consumers that are necessary for the fulfillment of function of the vehicle function. The method 500 may determine energy paths, communication paths and/or energy consumers to be activated for activating the vehicle function by means of an address chain of the vehicle function. The method 500 may lead to energy savings, as only the energy consumers required for the vehicle function are activated and the remaining energy consumers remain deactivated. The method 500 may thus increase a range of an electric vehicle, for example.

Figure 6:
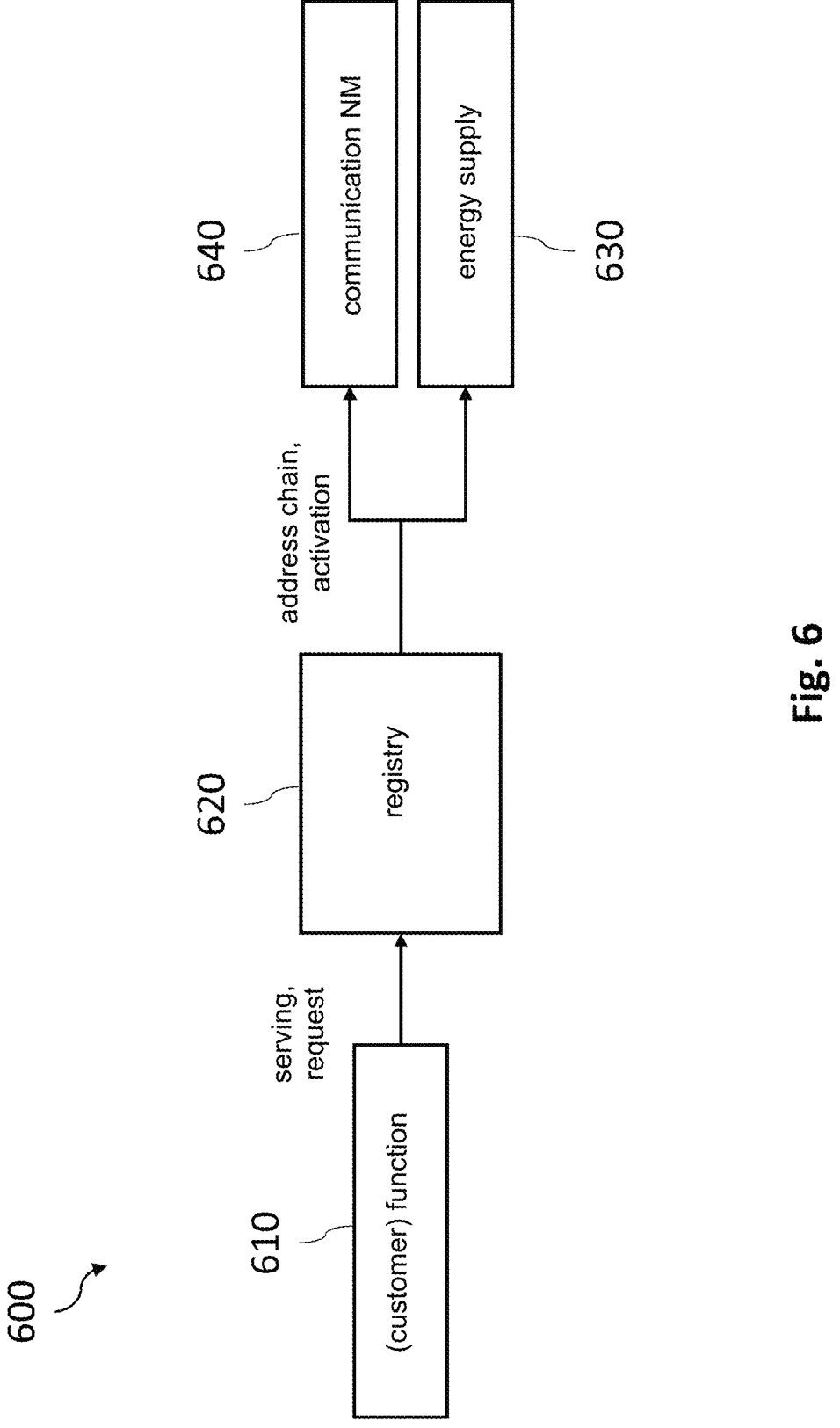
FIG. 6 to FIG. 9 illustrate flowcharts of further examples of a method of activating a vehicle function of a vehicle.

FIG. 6 illustrates a flowchart of a further example of a method 600 of activating a vehicle function of a vehicle.

The method 600 comprises receiving 610 a command to activate the vehicle function ((customer) function). A control of a user interface of the vehicle may have triggered (sent) the command to activate based on an operation of the user interface. The command to activate the vehicle function indicates an identifier of the vehicle function.

The method 600 further comprises determining 620 an identifier of an energy path of the plurality of energy paths associated with the vehicle function identifier. Determining 620 comprises accessing a database ("registry") to retrieve a data set of the vehicle function. The data set comprises the association of the energy path identifier with the vehicle function identifier.

The method 600 further comprises, in response to the command to activate the vehicle function, selectively activating 630 the energy path to provide electrical energy to at least one energy consumer of the plurality of energy consumers, wherein the energy consumer is configured to perform the vehicle function. For this purpose, the method 600 comprises driving an energy supply network ("energy supply") of the vehicle.

The method 600 further comprises determining an identifier of a communication path of the vehicle associated with the identifier of the vehicle function. This may be done in a similar way to step 620 using the database. The method 600 comprises sending 640 a command to perform the vehicle function to a control of another energy consumer of the plurality of energy consumers connected to the communication path. For this purpose, the method 600 comprises driving a communication network ("communication NM"; network management) of the vehicle.

Figure 7:
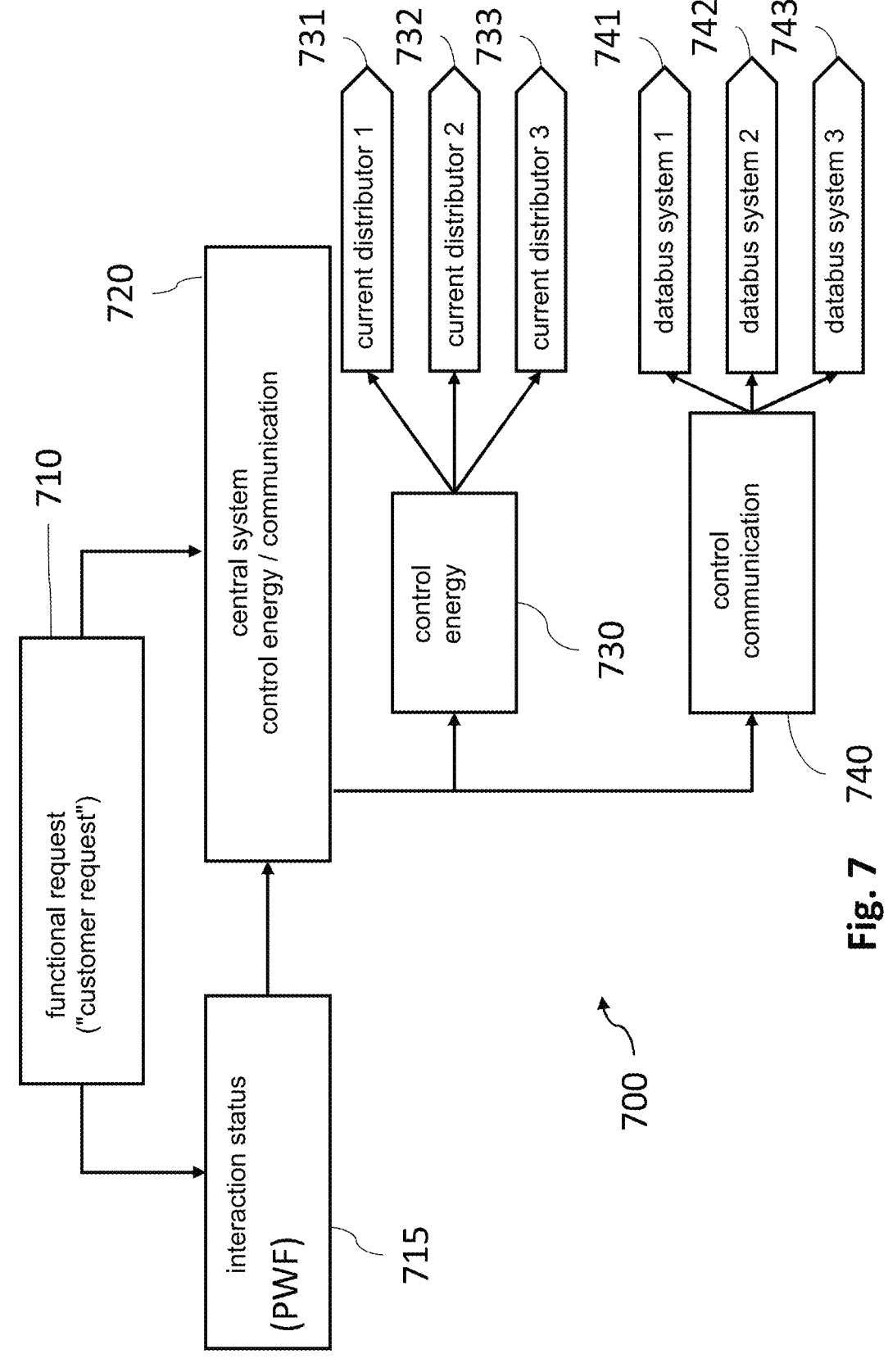

FIG. 7 illustrates a flowchart of a further example of a method 700 of activating a vehicle function of a vehicle.

The method 700 comprises receiving 710 a command ("functional request") to activate the vehicle function, wherein the command to activate the vehicle function indicates an identifier of the vehicle function.

The method 700 further comprises determining 715 an interaction status of the vehicle. An interaction status of the vehicle indicates, for example, whether the vehicle is parked (P: Parking), whether the vehicle is stationary and a user is in the vehicle (W: Living) or whether the vehicle is driving (F: Driving). Depending on the interaction status, certain vehicle functions of the vehicle may be activated.

The method 700 further comprises determining 720 an identifier of an energy path of the plurality of energy paths associated with the identifier of the vehicle function and an identifier of a communication path associated with the identifier of the vehicle function. To this end, a central control device of the vehicle ("central system") accesses an address chain of the vehicle function and reads out the identifier of the energy path and the identifier of the communication path.

The method 700 further comprises selectively activating 730 the energy path to provide electrical energy to at least one energy consumer of the plurality of energy consumers, wherein the energy consumer is configured to perform the vehicle function. For this purpose, the central control device transmits the energy path identifier to a control located on a higher level to the energy consumer ("control energy"). The control is configured to drive 731 a current distributor 1, drive 732 a current distributor 2 and drive 733 a current distributor 3. The control selects one of the current distributors according to the energy path identifier and controls the same to activate the energy path connected to the selected current distributor.

The method 700 comprises sending 740 a command to perform the vehicle function to a control of a further energy consumer of the plurality of energy consumers connected to the communication path, wherein the further energy consumer is configured to perform the vehicle function. To this end, the central control device transmits the communication path identifier to a communication control. The communication control is configured to drive 741 a data bus system 1, drive 742 a data bus system 2 and drive 743 a data bus system 3. The communication control selects one of the data bus systems according to the identifier of the communication path and controls the same in order to address the communication path connected to the selected data bus system.

The central control device ("Central system Control Energy/Communication") may use the above address chains and drive both the energy and the communication according to a function request (functional request). An energy control may switch current distributors installed in the vehicle on and/or off. In a similar way, a communication control may drive communication paths or data bus systems provided in the vehicle. The central control device is therefore higher-level or upstream of the energy control and the communication control.

The activation of a vehicle function may trigger an activation of energy consumers associated with the vehicle function by means of an address chain of the vehicle function. This may require initialization (initiation) of the energy consumers. For example, a master function may be implemented that makes the following case distinction:

Function "Active ON" means this is the master function. "Switches on"

Function "Passive ON" means that this is a function activated by the address chain. "Will be switched on"

In some embodiments, in response to a command to deactivate the vehicle function, the method 700 comprises deactivating the energy paths. The method 700 may address the energy consumers to be deactivated using the address chain associated with the vehicle function. Activation and deactivation may be controlled via a network management system NM, for example.

Figure 8:
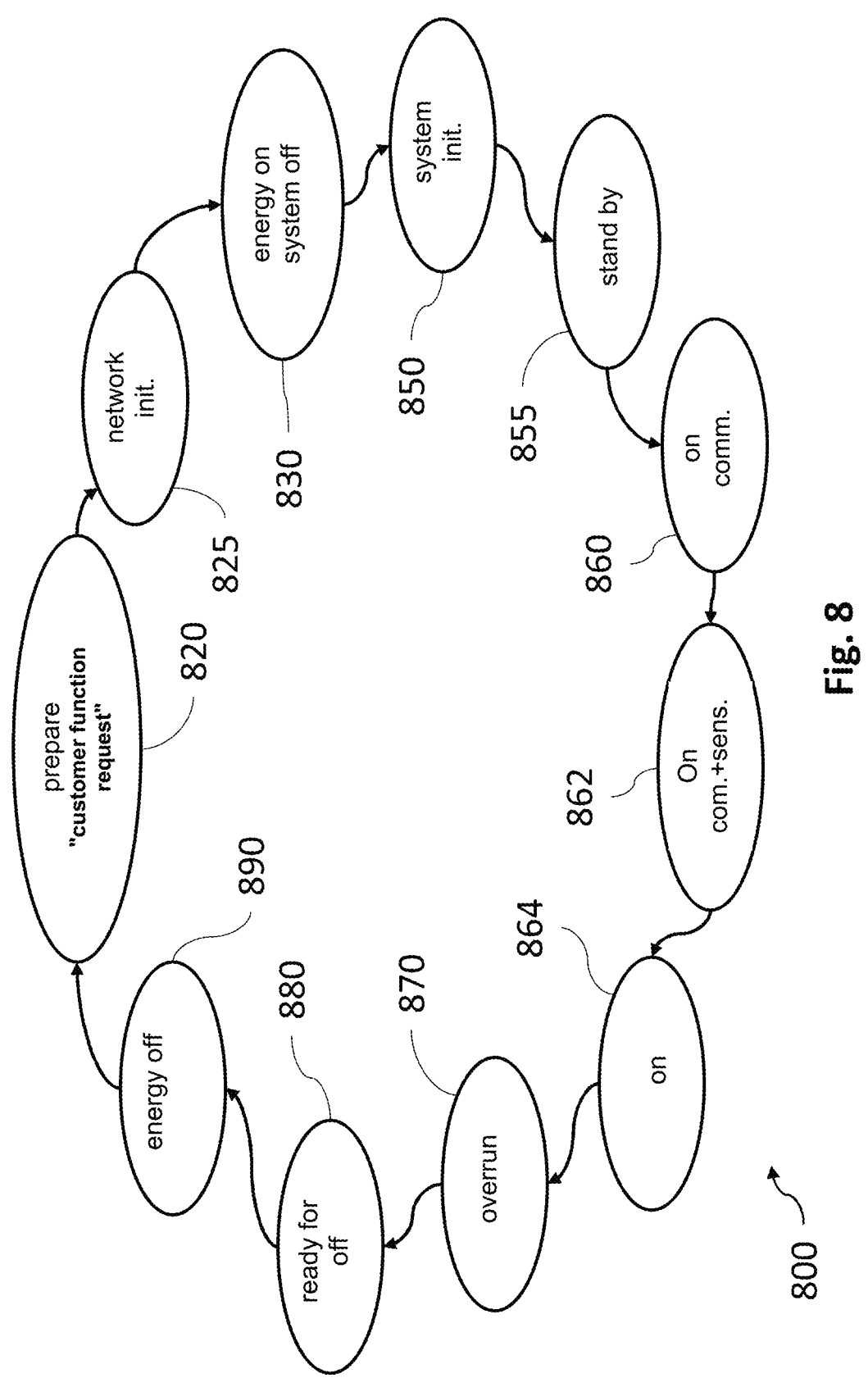

FIG. 8 illustrates a flowchart of a further example of a method 800 of activating a vehicle function of a vehicle. The flowchart in FIG. 8 may be understood as a state machine of an energy and communication coordination when the vehicle function is activated.

The method 800 comprises receiving a command to activate the vehicle function and determining 820 an identifier of an energy path of the plurality of energy paths associated with an identifier of the vehicle function ("prepare customer function request").

The method 800 further comprises initializing 825 a network system (of a sub-network of an on-board network of the vehicle) and selectively activating 830 the energy path to provide electrical energy to at least one energy consumer of the plurality of energy consumers, wherein the energy consumer is configured to perform the vehicle function.

The method 800 further comprises: initializing 850 the energy consumer, setting 855 a standby mode of the energy consumer, activating 860 a communication path of the energy consumer, activating 862 a sensor of the energy consumer and a communication path of the sensor, and setting 864 an operation mode of the energy consumer. In this context, a control of the energy consumer may decide locally whether and how many system resources (e.g., computing power, peripheral activation) it makes available to the energy consumer to fulfill its function. The method 800 may thus support a decentralized system resource control and decentralized optimization of the energy efficiency of the on-board network.

To deactivate the energy consumer, the method 800 further comprises: performing 870 an overrun of the energy consumer (e.g., calibrating the energy consumer or storing measurement data of the energy consumer or the sensor in a data storage), determining 880 whether the overrun is completed and the energy consumer is disconnectable, and deactivating 890 the energy path to the energy consumer.

Figure 9:
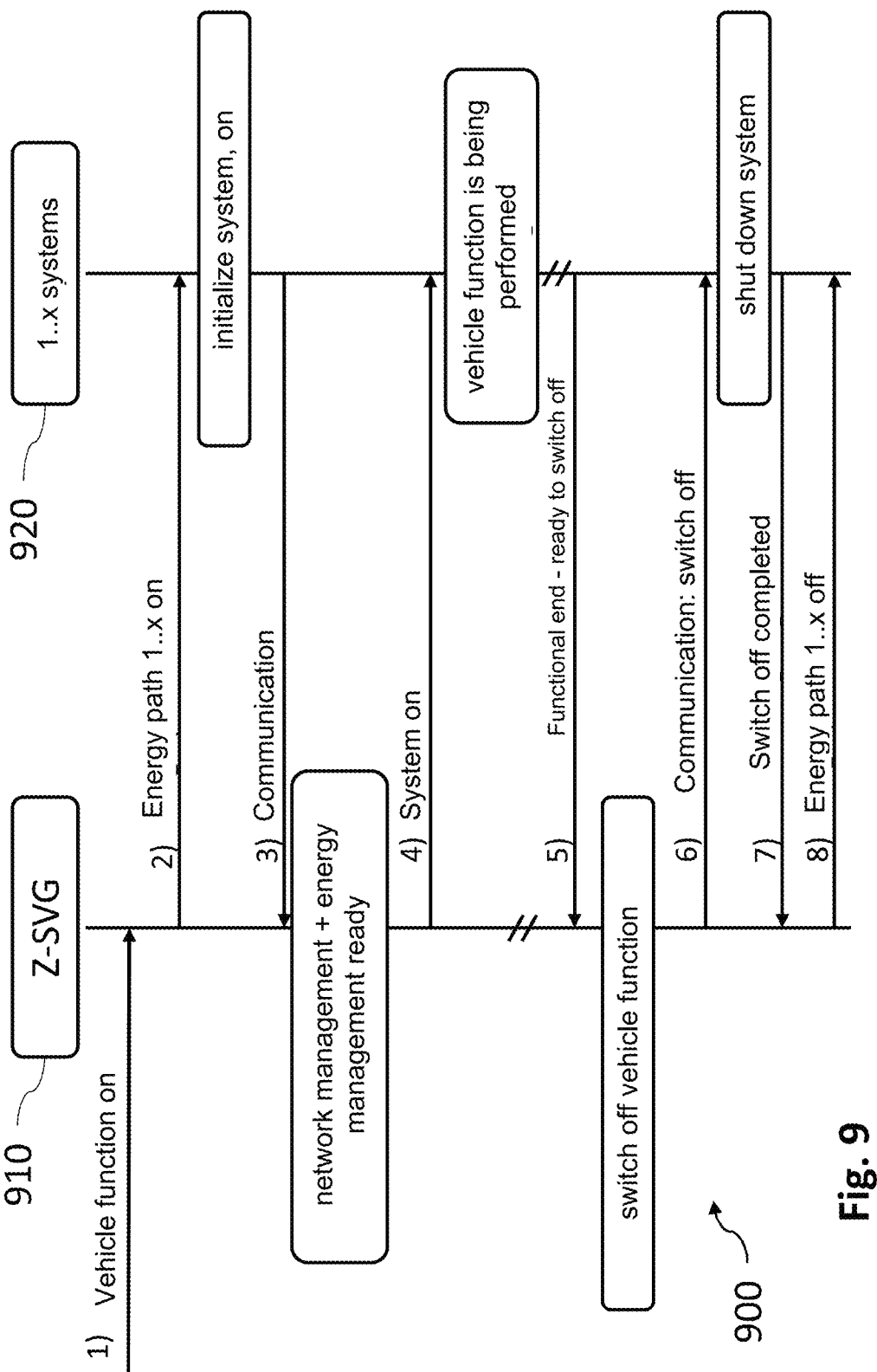

FIG. 9 illustrates a flowchart of a further example of a method 900 of activating a vehicle function of a vehicle.

To this end, an apparatus 910 performing the method 900 is communicatively connected via a communication path to multiple energy consumers 920 ("1 . . . x systems") intended for performing the vehicle function, for example via a data bus system. An exchange of information via the communication path is illustrated in FIG. 9 using signal flow arrows. It should be noted that a signal flow (a network communication) between the apparatus 910 and the energy consumers 920 may also take place indirectly via other communication nodes of the vehicle, such as one or more gateways. In addition, the network communication shown in FIG. 9 may also take place between a control of the energy consumer 920 and the apparatus 910. Multiple communication paths or a respective communication path may be intended for network communication between the apparatus 910 and multiple energy consumers.

The apparatus 910 ("Z-SVG") may be a central control device, a current distributor or a gateway module, for example.

In a first step 1), the apparatus 910 receives a command to activate the vehicle function ("customer function master"). In a second step 2), the apparatus 910 selectively activates a respective energy path to the energy consumers 920 according to an association with the energy consumers 920 to the vehicle function ("Channel 1 . . . x energy on"). The energy consumers 920 are then initialized.

In a third step 3), the apparatus 910 receives feedback from a control of the energy consumers indicative of a completed initialization of the energy consumers 920 ("communication"). The apparatus 910 then determines whether an energy network and a communication network of the vehicle are ready to perform the vehicle function. In a fourth step 4), the apparatus 910 sends a command to perform the vehicle function to the control of the energy consumers 920 ("system's ready"). The energy consumers 920 then perform the vehicle function.

In a fifth step 5), the apparatus 910 receives feedback indicative of a completed execution of the vehicle function ("Function end—ready for off") from the energy consumers 920. The apparatus 910 then prepares to deactivate the vehicle function. In a sixth step 6), the apparatus 910 sends a command to shut down the energy consumers 920 to a control of the energy consumers 920 ("communication off"). The energy consumers 920 are then shut down.

In a seventh step 7) the apparatus 910 receives feedback indicative of a completed shutdown of the energy consumers 920 from the control. In an eighth step 8), the apparatus 910 selectively deactivates the respective energy paths to the energy consumers 920.

In some embodiments, a method of activating a vehicle function proposed herein, such as method 500, 600, or 700, may further comprise, after selectively activating the energy path, receiving feedback indicative of a completed initialization of the energy consumer from a control of the energy consumer (e.g., energy control). Further, the method may include sending a command to the control of the energy consumer to perform the vehicle function. The method may thus monitor proper initialization of the energy consumer.

In some embodiments, the method further comprises receiving a command to deactivate the vehicle function and, in response to the command to deactivate the vehicle function, sending a command to a control of the energy consumer to shut down the energy consumer.

The method may include switching energy consumers on or off according to a functional requirement. For example, the method may include checking which vehicle functions of the vehicle are active and retrieving address chains of the active vehicle functions. The method may also include determining which energy consumers are active. By aligning the retrieved address chains with the specific energy consumers, it is also possible to determine which energy consumers should be switched off or on.

In some embodiments, the method comprises receiving a command to activate a further vehicle function while the aforementioned vehicle function is active. The method may include determining which additional energy consumers are necessary for the further vehicle function based on a comparison of the address chain of the vehicle function and an address chain of the further vehicle function. The method may include selectively activating the specific additional energy consumers. To terminate the vehicle function while the other vehicle function is active, the method may include deactivating the energy consumers associated with the vehicle function and not associated with the other vehicle function. This deactivates energy consumers of the vehicle that are not required neither by the vehicle function nor by other vehicle functions.

In some embodiments, the method further comprises, after sending the command to shut down the energy consumer, receiving feedback indicative of a completed shutdown of the energy consumer from the control. The method further comprises deactivating the energy path in response to the feedback from the control. As a result, the method may reduce standby energy requirement of the energy consumption.

In some embodiments, the method further comprises receiving a command to deactivate the vehicle function and, in response to the command to deactivate the vehicle function, determining whether the energy consumer performs another vehicle function of the vehicle. If it is determined that the energy consumer does not perform any other vehicle function, deactivating the energy path.

Further embodiments relate to a control device for activating a vehicle function of a vehicle. For example, the control device may be configured to perform a method of activating the vehicle function, such as method 500, 600 or 700. The control device comprises a control circuit configured to receive a command to activate the vehicle function, the command to activate the vehicle function specifying an identifier of the vehicle function. The control circuit is further configured to determine an identifier of an energy path of the plurality of energy paths associated with the identifier of the vehicle function and, in response to the command to activate the vehicle function, to selectively activate the energy path to provide electrical energy to at least one energy consumer of the plurality of energy consumers. The energy consumer is configured to perform the vehicle function.

Further embodiments relate to a vehicle comprising a plurality of energy paths, a plurality of energy consumers and the above-mentioned control device for activating a vehicle function of the vehicle. Further details and aspects of the control device or vehicle are explained in connection with the proposed technology or one or more examples described above, e.g., with reference to FIG. 5. The control device or the vehicle may comprise one or more additional optional features corresponding to one or more aspects of the proposed technique or one or more examples described above.

The proposed technology provides a method, a control device or a vehicle for activating a vehicle function based on an address chain of the vehicle function. The proposed technology may enable fine-grained, selective driving of energy flows and data flows in a vehicle's on-board network. This may reduce an energy requirement and communication volume of the on-board network. The technology may further enable the energy flows and data flows to be driven centrally via an address chain of the vehicle function, which may reduce the susceptibility of the vehicle on-board network to faults.

Figure 10:
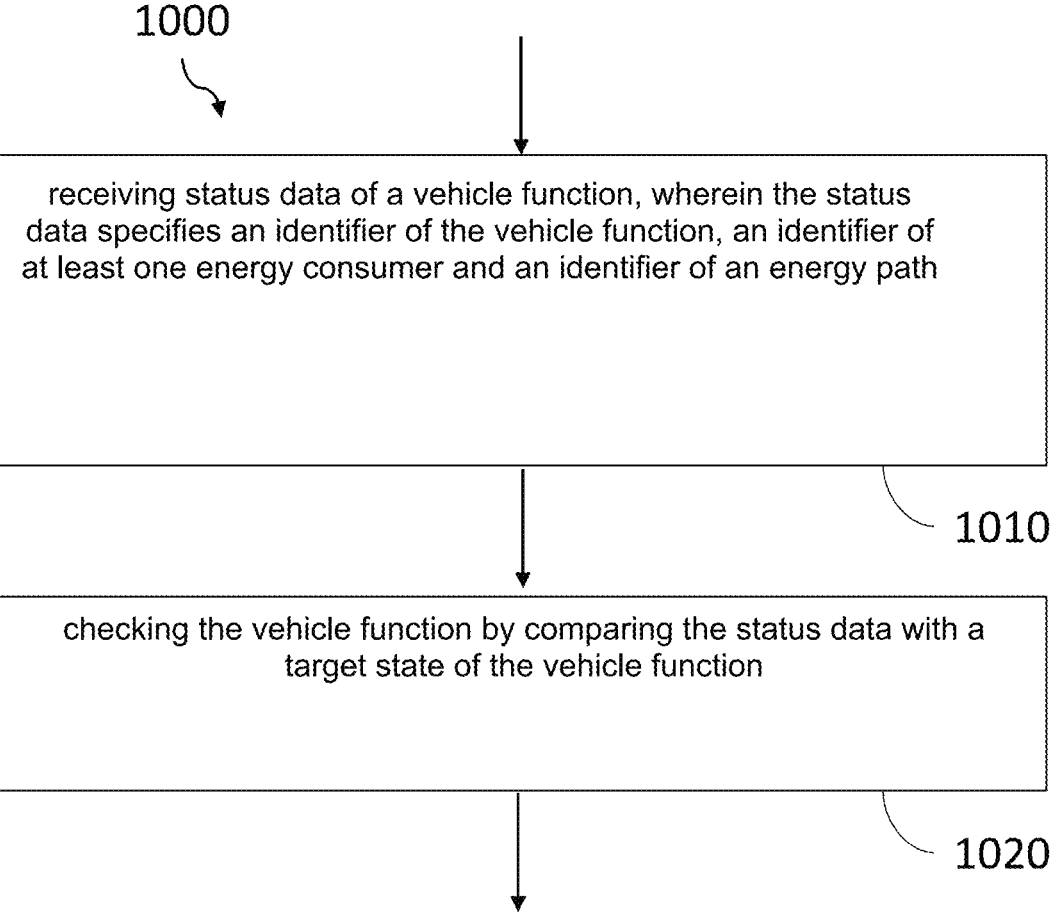
FIG. 10 illustrates a flowchart of an example of a method of checking a vehicle function of a vehicle.

FIG. 10 illustrates a flowchart of an example of a method 1000 for checking a vehicle function of a vehicle. The method 1000 may be performable by means of a suitable electronic circuit. The method 1000 may be performable using a control device of the vehicle, for example. For example, the control device may include a machine-readable storage medium having stored thereon a program comprising a program code that performs the method 1000 when the program is executed on a processor or programmable hardware. In some embodiments, steps of the method 1000 may be performed by multiple processors and/or in-vehicle/off-vehicle control devices.

As described above, the vehicle comprises a plurality of energy paths and a plurality of energy consumers, with each energy path of the plurality of energy paths comprising at least one energy consumer of the plurality of energy consumers.

The method 1000 comprises receiving 1010 status data of the vehicle function. The status data indicates an identifier of the vehicle function, an identifier of at least one energy consumer of the plurality of energy consumers and an identifier of an energy path of the plurality of energy paths.

The status data is also indicative of the provision of electrical energy for the energy consumer via the energy path to perform the vehicle function. The status data 1000 may indicate the actual status of the vehicle function. The status data may be understood as information about actual activations of energy consumers due to the vehicle function.

Receiving 1010 the status data may be based on a request to check the vehicle function. For example, a control device performing the method 1000 may receive the request from an off-vehicle diagnostic device or a mobile device of a user of the vehicle when, for example, maintenance is to be performed on the vehicle. The request may be made via wireless or wired communication between the control device and the diagnostic device and/or mobile device. Additionally, or alternatively, the request to check the vehicle function may be triggered by the control device itself or another in-vehicle control at regular time intervals or by a trigger event (such as recognizing a fault in the vehicle). The request indicates the identifier of the vehicle function.

After receiving the request to check the vehicle function, the control device may send a request for status data via a communication network of the vehicle to energy consumers, either directly or via its control. Alternatively, the control device may retrieve an address chain of the vehicle function from a data storage according to the request. The address chain contains an association of the identifier of the vehicle function with identifiers of all energy paths, energy consumers and/or communication paths relevant for the execution of the vehicle function. The control device may address the request for status data purposefully only to the relevant energy consumers in order to reduce the communication volume in the communication network. An alternative to requesting the status data is that the energy consumers or their higher-level controls send the status data to the control device performing the method 1000, for example at regular time intervals or when significant operating parameters of the energy consumers change. For example, the energy consumers may send status data when they are activated or when they switch to a different operating mode. The status data may be made up of data coming from multiple energy consumers and/or controls.

The status data may comprise a time stamp indicating a point in time at which an energy consumer sending the status data has determined or captured that the electrical energy is being provided.

In some embodiments, the status data may further include at least one of a switching duration, a switching frequency of the energy path and/or a communication path to the energy consumer, a status message and an energy consumption of the energy consumer. For example, data on the switching duration and switching frequency of the energy path may have been captured by a current distributor located on a higher level to the energy path or an energy control of the vehicle and stored in a data storage.

In some embodiments, receiving 1010 the status data comprises receiving the status data of the vehicle function for multiple points in time at which the vehicle function is active. In other words, the method 1000 may comprise capturing a progression of activations of energy consumers, energy paths and/or communication paths over time. The activations may be associated with an identifier of a vehicle function that is causal for the respective activation.

In some embodiments, receiving 1010 the status data comprises receiving status data of a further vehicle function of the vehicle for a transition from the vehicle function to the further vehicle function. For example, the aim of method 1000 may be to check that the transition to the further vehicle function is running properly. A control device performing the method 1000 may then activate the vehicle function, for example by means of a method of activating the vehicle function, such as method 500, and activate the further vehicle function after a specified time. The control device receives status data for the vehicle function from the energy consumers performing the vehicle function and status data for the other vehicle function from the energy consumers performing the other vehicle function.

The status data may also indicate an identifier of at least one communication path to the energy consumer. The status data indicates that the communication path for performing the vehicle function is active. This may be particularly advantageous for energy consumers that are only drivable via the communication network and do not have a switchable energy path.

Referring back to FIG. 10: The method 1000 further comprises checking 1020 the vehicle function by comparing the status data with a target state of the vehicle function. Checking 1020 the vehicle function may serve troubleshooting (diagnostics) when operating the vehicle function. If an undesirable behavior of the vehicle function is detected, an error may be issued.

The target state may be defined based on the address chain of the vehicle function, for example. The address chain may be stored in a data storage in the vehicle and/or externally on a server and retrieved for maintenance purposes, for example. The address chain may contain, for example, a desired temporal or functional sequence of activations of energy consumers, energy paths and/or communication paths for performing the vehicle function.

The comparison of the status data with the target state may be implemented in different ways, e.g., an actual temporal sequence of activations of energy consumers, which results from the status data, may be compared with the desired temporal sequence. In addition, energy consumers activated on the basis of the vehicle function (their identifiers, number, actual energy consumption, etc.) may be compared with the energy consumers resulting from the address chain (their identifiers, number, target energy requirement, etc.).

Checking 1020 the vehicle function may include determining whether a deviation has occurred when comparing the status data with the target state. In some examples, a threshold value may be defined for the deviation, which, if exceeded, causes an error message to be issued.

Checking 1020 the vehicle function may comprise checking at least one further vehicle function. For this purpose, the method 1000 may comprise activating the other vehicle function and receiving status data of the other vehicle function. A control device performing the method 1000 may further process the status data and compare it with a target state of the vehicle function and the other vehicle function. The control device may check multiple combinations of the vehicle function with other vehicle functions of the vehicle. This may be advantageous if energy consumers and energy paths serve multiple vehicle functions and their behavior (such as energy requirement or temporal behavior) is to be checked when the vehicle functions are activated or operated at the same time.

The method 1000 may facilitate checking a proper sequence of activation, deactivation and operation of the vehicle function under various conditions, such as when the vehicle function is operated alone, when other vehicle functions are activated in parallel or when there is a transition to other vehicle functions. The check is based on the address chain of the vehicle function, which indicates a target state of the vehicle function. The method 1000 may enable a more precise fault analysis of the vehicle function, as a behavior of individual energy paths, communication paths and energy consumers of the vehicle function may be checked. This makes it easier to identify the cause of a fault and subsequent maintenance may be more targeted, i.e., only energy consumers that are actually faulty may be replaced. Further, the method 1000 makes it easier to recognize whether the address chain was created correctly during development, whether the address chain was properly stored (registered) in the vehicle and whether the energy consumers are correctly started up and shut down according to the address chains based on monitoring of the time sequences and automated tests for function transitions. The method 1000 may further enable a check of emergency running and reset strategies in the event of vehicle function faults and for checking the fault memory entries. This ensures that these strategies are complete.

In some embodiments, the method 1000 comprises creating a graph of the vehicle function, wherein the graph comprises at least one node and an edge of the node. The node represents the energy consumer and the edge represents the energy path to the energy consumer. Checking 1020 the vehicle function may then comprise applying a graph-theoretic algorithm to the graph of the vehicle function. Examples of a graph are shown in FIG. 11a-f.

The vehicle function being checked by the method 1000 may require activation of multiple energy paths of the plurality of energy paths and multiple energy consumers of the plurality of energy consumers for execution thereof. In this case, the status data indicates an identifier of the multiple energy consumers and an identifier of the multiple energy paths. For example, the status data indicates a respective identifier for each of the multiple energy consumers and for each of the multiple energy paths. Creating the graph of the vehicle function may comprise creating a respective node of the graph for each of the multiple energy consumers and creating a respective edge of the graph for each of the multiple energy paths.

The graph may be understood as a network model for evaluating the energy network and/or communication network of the vehicle. The graph describes the interconnection of energy consumers via energy paths and/or communication paths. Using the graph, energy and/or data flows between energy consumers may therefore be modeled. In order to consider the communication network in the evaluation, a further edge of the graph may be created for each communication path to an energy consumer that is active due to the vehicle function. The edge is then connected to a node of the corresponding energy consumer or the corresponding energy consumers.

To model the communication network, the method 1000 may include creating a second graph. The second graph models nodes that represent the active energy consumers of the vehicle function and edges between the nodes that represent the communication paths of the energy consumers.

Checking 1020 the vehicle function may include creating a graph based on the status data (actual state) and creating a comparison graph based on the address chain (target state). In order to check a progression of the energy and/or data flows over time, status data may be received for multiple points in time and a graph may be created for each of the points in time.

The above-mentioned graph-theoretical algorithm that may be applied to the graph may be any algorithm for evaluating the graph, for example an algorithm for calculating the energy and/or data flows of the graph or an algorithm for comparing the graph with the comparison graph.

A transition from the vehicle function to at least one other vehicle function may be checked using the graph. For example, the method 1000 may include receiving status data of the vehicle function (its energy consumers and energy paths) and the further vehicle function (its energy consumers and energy paths) for a transition period.

In some embodiments, the method 1000 comprises creating a pixel image for the status data. In this case, checking 1020 the vehicle function may comprise applying an image processing method to the pixel image. Examples of a pixel image are shown in FIG. 12a-d.

A control device performing the method 1000 may create the pixel image by transferring an on-board network configuration of the vehicle to a structure in a three-dimensional model. The pixel image may be understood as a three-dimensional (RGB) color space. The color space is spanned by a communication status axis, an energy status axis and an interaction status axis, for example. The on-board network configuration has a communication status, an energy status and an interaction status, which are represented by the respective axis. The communication status indicates which communication paths are active due to the vehicle function. The energy status indicates which energy paths of the plurality of energy paths are active due to the vehicle function. The communication status and the energy status may be derived from the status data. The interaction status indicates, for example, whether the vehicle is parked (P: Parking), whether the vehicle is stationary and a user is in the vehicle (W: Living) or whether the vehicle is driving (F: Driving).

The control device may associate a pixel value with the on-board network configuration, wherein the pixel value associates a real numerical value with the communication status, the energy status and the interaction status. The pixel value may be associated using an association rule that defines a numerical value for each interaction status, each energy path and each communication path of the vehicle. The association rule may be stored in a database in the control device.

The pixel value of the pixel image may be associated with the status data according to a system relevance of the vehicle function. For example, a pixel value for fuses in central current distributors may be selected so that the pixel value is close to an origin of the color space (the origin may represent an energy source or a gateway, for example), while fuses close to the consumer are associated with a pixel value at the end of the axis of the color space. A change in a pixel value close to the origin may therefore indicate far-reaching subsequent changes to the on-board network configuration. Pixels on the communication status axis correspond to energy consumers that are continuously supplied (pure communication). Pixels on the energy status axis correspond to energy consumers that are only energized and do not require communication (pure electricity supply).

For example, a pixel value may be associated with each active energy consumer (determined using the status data) according to the associated energy path and communication path. This results in a respective pixel value for each active energy consumer (at a specific point in time), wherein the pixel values of all active energy consumers may be transformed together into a pixel image. Alternatively, a pixel value of the vehicle function may be associated according to a combination of active energy paths and a combination of active communication paths of the vehicle function. This results in a respective pixel value for each active vehicle function (at a specific time). Other associations of pixel values, for example with specific sub-networks of the on-board network, may also be implemented. Method 1000 may thus enable versatile troubleshooting at different system levels (energy consumer level, vehicle function level, sub-network level) of the on-board network.

A respective pixel value may be associated with status data for different points in time in order to map a progression of on-board network configurations over time. The pixel values of all points in time may be displayed together in a pixel image or in a respective pixel image. The checking 1020 of the vehicle function may then comprise an evaluation of a (color) progression of the pixel images over time.

The above-mentioned image processing method that may be applied to the pixel image may include any method from image or signal processing that may be used to evaluate the pixel image. For example, the image processing method may include pattern recognition or image transformation.

The method 1000 may serve one or more evaluation objectives for checking the vehicle function. For example, an evaluation objective may be: a check of an interaction of multiple vehicle functions of the vehicle, a check of a temporal behavior of a vehicle function independently of other vehicle functions, a check of a transition of a vehicle function to another, a check of an activation, a deactivation or an operation of a vehicle function. Depending on the evaluation objective, the method 1000 may include activation of the vehicle functions to be observed and capture of status data of the vehicle functions for a specific period of time and at a specific time interval. Depending on the evaluation objective, the method 1000 may comprise selecting a suitable evaluation technique (such as creating a graph or creating a pixel image). As a result, the method 1000 may enable a variety of troubleshooting procedures and facilitate and refine troubleshooting in the vehicle. This may contribute to a higher system safety of the vehicle.

FIG. 11a-f show examples of a graph 1100 of a vehicle function of a vehicle. Creating the graph 1100 represents a technique for processing status data of the vehicle function. The graph 1100 has been created by a method of checking the vehicle function, such as method 1000.

Figures 11A, 11B, 11C:
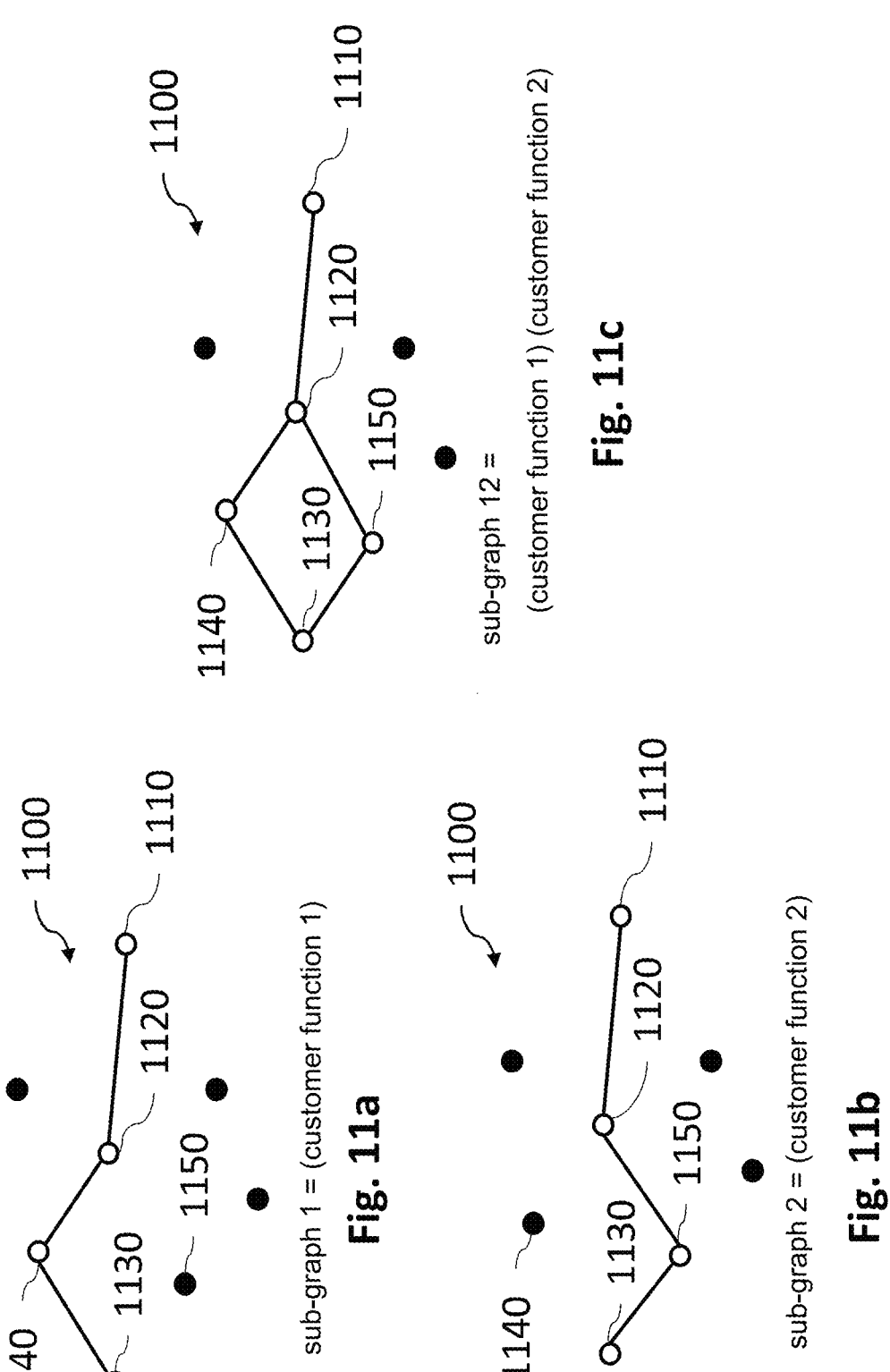
FIG. 11a-f illustrate examples of a graph for checking a vehicle function of a vehicle.

The graph 1100 comprises multiple nodes, each of which represents an energy consumer of the vehicle. In FIG. 11a-c, eight nodes are shown as a simplified example, for example nodes 1110, 1120, . . . , 1150. In other examples, the graph 1100 may comprise a different number of nodes than that shown in FIGS. 11a-f The graph 1100 may comprise n≥2 nodes. An arrangement of the nodes shown in FIG. 11a-c is for illustrative purposes only. In other examples, the nodes may be arranged differently than shown in FIG. 11a-f, for example in a grid. Active nodes of the graph 1100, which are shown as an empty circle in FIG. 11a-f, represent active energy consumers and inactive nodes of the graph 1100, which are shown as a filled circle in FIG. 11a-f, represent inactive energy consumers. Active nodes are connected with edges (lines) that represent an active energy path to the respective energy consumer.

In FIG. 11a, the graph 1100 shows an active state of a first vehicle function (customer function 1). In the active state of the first vehicle function, four energy consumers are active, which are represented by the nodes 1110, 1120, 1130 and 1140.

In FIG. 11b, the graph 1100 shows an active state of a second vehicle function (customer function 2). In the active state of the second vehicle function, the energy consumers of the nodes 1110, 1120 and 1130 are active, as in FIG. 11a. The node 1140 is inactive, the node 1150 is active.

Some address chains may be merged to limit a database for address chains of vehicle functions. With the help of graph theory methods, for example, vehicle functions with similar graphs may be searched for and merged. Graphs may be considered similar if the majority of their active nodes are the same and the differing active nodes belong to energy consumers that have a low energy requirement.

Merging the graph 1100 from FIG. 11a and FIG. 11b is shown in FIG. 11c. The resulting graph 1100 in FIG. 11c is a union of the two graphs 1100 from FIG. 11a and FIG. 11b. Subordinate subgraphs (levels) for communication and/or energy may be derived from the graph 1100 shown in FIGS. 11a-c. These subgraphs may be temporarily active depending on the functional requirement.

Figures 11D, 11E, 11F:
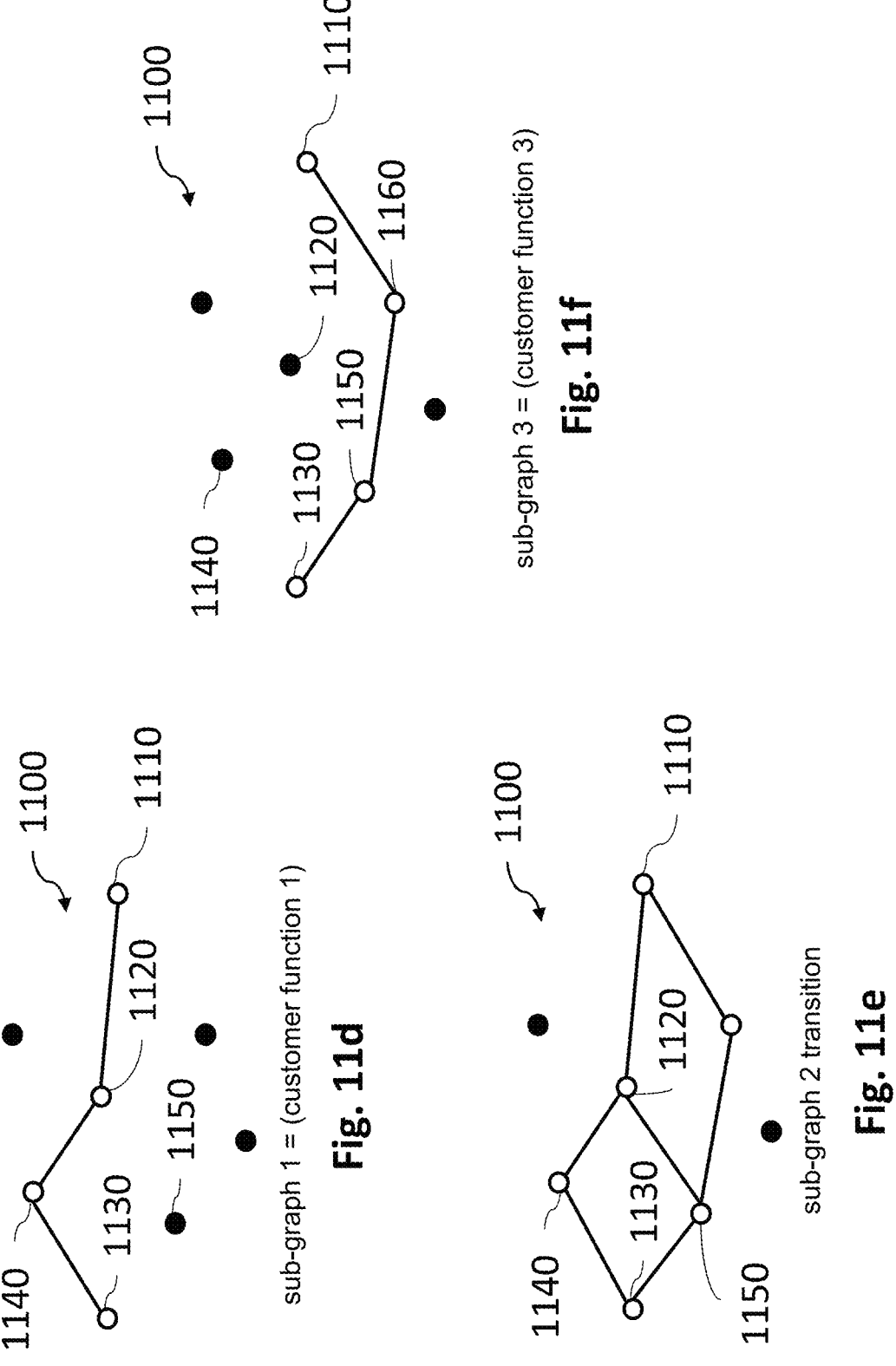

In FIG. 11d-f, the graph 1100 shows a transition from an active state of the first vehicle function (FIG. 11d) to an active state of a third vehicle function (FIG. 11f). In the active state of the third vehicle function, nodes 1110, 1130, 1150 and one node 1160 are active. FIG. 11e shows a transitional state in which the first vehicle function and the third vehicle function are active for a point in time in which the first vehicle function has not yet been deactivated and the third vehicle function has already been activated. This results in an extension of the graph 1100 in FIG. 11e compared to the graph 1100 in FIG. 11d (add-on system) and a reduction (take-off system) towards the graph 1100 in FIG. 11f.

This allows overlapping effects to be monitored during the transition from the first vehicle function (and its configuration) to the third vehicle function. The vehicle function is described and controlled by an address chain. This may enable quick target/actual comparisons and thus facilitate a diagnosis of the system transitions. If, for example, an edge or a node in the graph 1100 is missing at a certain point in time (according to a comparison with a target state derived from the address chain), the transition may be temporarily unstable. The same may apply if there is one edge or one node too many in the graph 1100 at a certain point in time. In these cases, undesirable system reactions and increased energy consumption may occur.

FIG. 12a-d show examples of a pixel image 1200. Creating the pixel image 1200 represents a technique for processing status data of a vehicle function. The pixel image 1200 has been created by a method of checking the vehicle function, such as method 1000. The method of checking the vehicle function may include creating the pixel image 1200 based on status data of the vehicle function and/or on a graph of the vehicle function, such as graph 1100.

The pixel image 1200 is shown as a three-dimensional space spanned by a communication status axis 1210, an interaction status axis 1220, and an energy status axis 1230. Each axis indicates an intensity value of an RGB color space; in FIG. 12a-d, the communication status axis 1210 indicates an intensity value for the color red, the interaction status axis 1220 indicates an intensity value for the color green, and the energy status axis 1230 indicates an intensity value for the color blue. In the pixel image 1200, the communication status, the interaction status, the energy status of a vehicle function, an energy consumer or an entire on-board network of a vehicle may be displayed in color. The color results from the intensity value that is associated with a communication status, an interaction status or an energy status. The communication status indicates which communication paths are active due to the vehicle function or which communication paths of the energy consumer or the vehicle electrical system are active, the energy status indicates which energy paths are active, and the interaction status indicates in which operating state (parking, living, driving) the vehicle is.

Figure 12A:
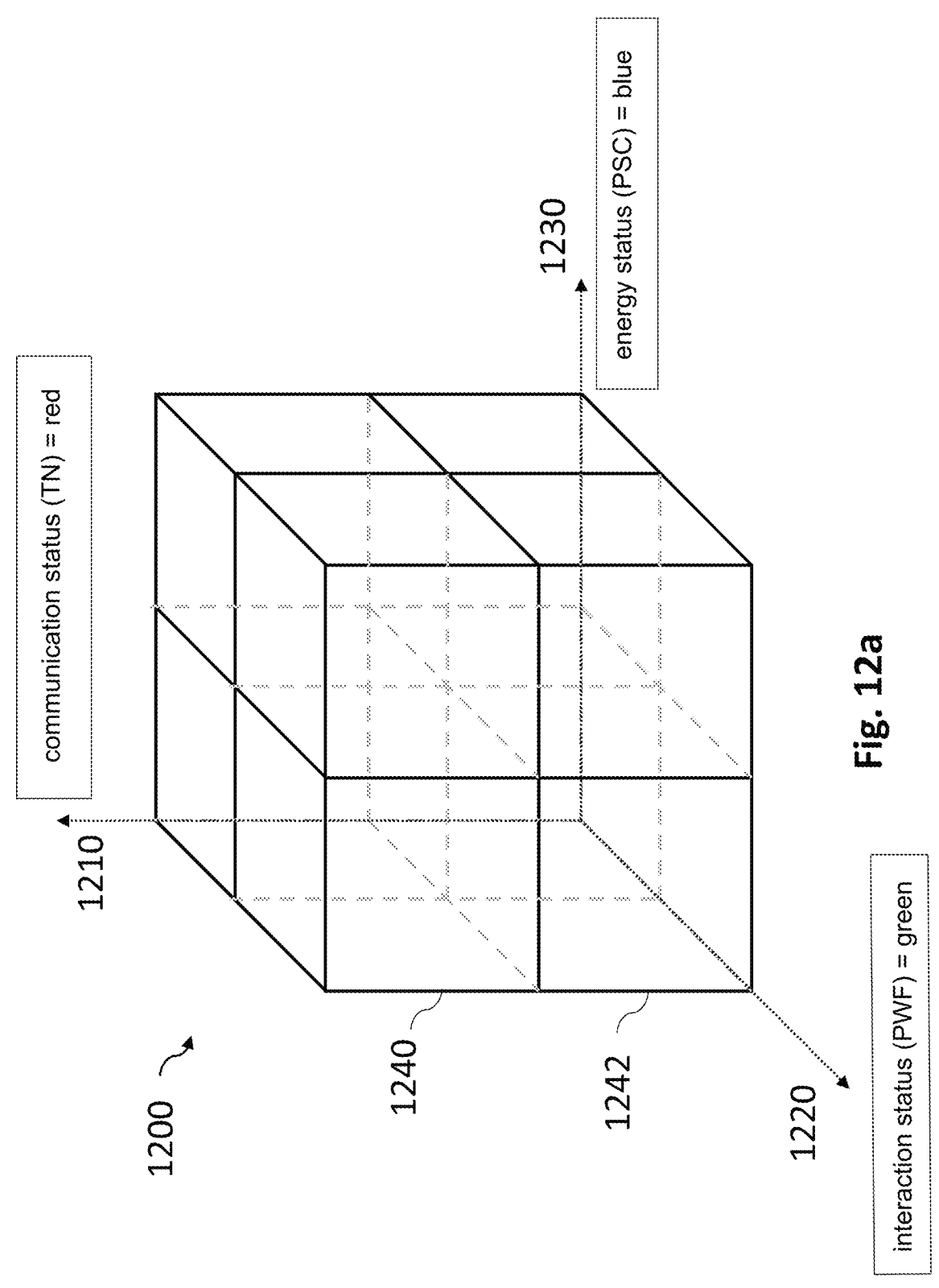
FIG. 12a-d illustrate examples of a pixel image for checking a vehicle function of a vehicle.

In FIG. 12a, the pixel image 1200 shows multiple cube-shaped substructures, e.g., 1240, 1242. Each of the substructures corresponds to one pixel of the pixel image 1200. The pixel image 1200 in FIG. 12a is intended to illustrate the buildup of a pixel image. The pixel image 1200 in FIG. 12a therefore does not contain any pixel values of the vehicle function. It should be noted that in other embodiments, a pixel image, for the purposes of the present disclosure, may be build up differently than the pixel image 1200, for example, two-dimensionally (with communication status axis and energy status axis).

Figure 12B:
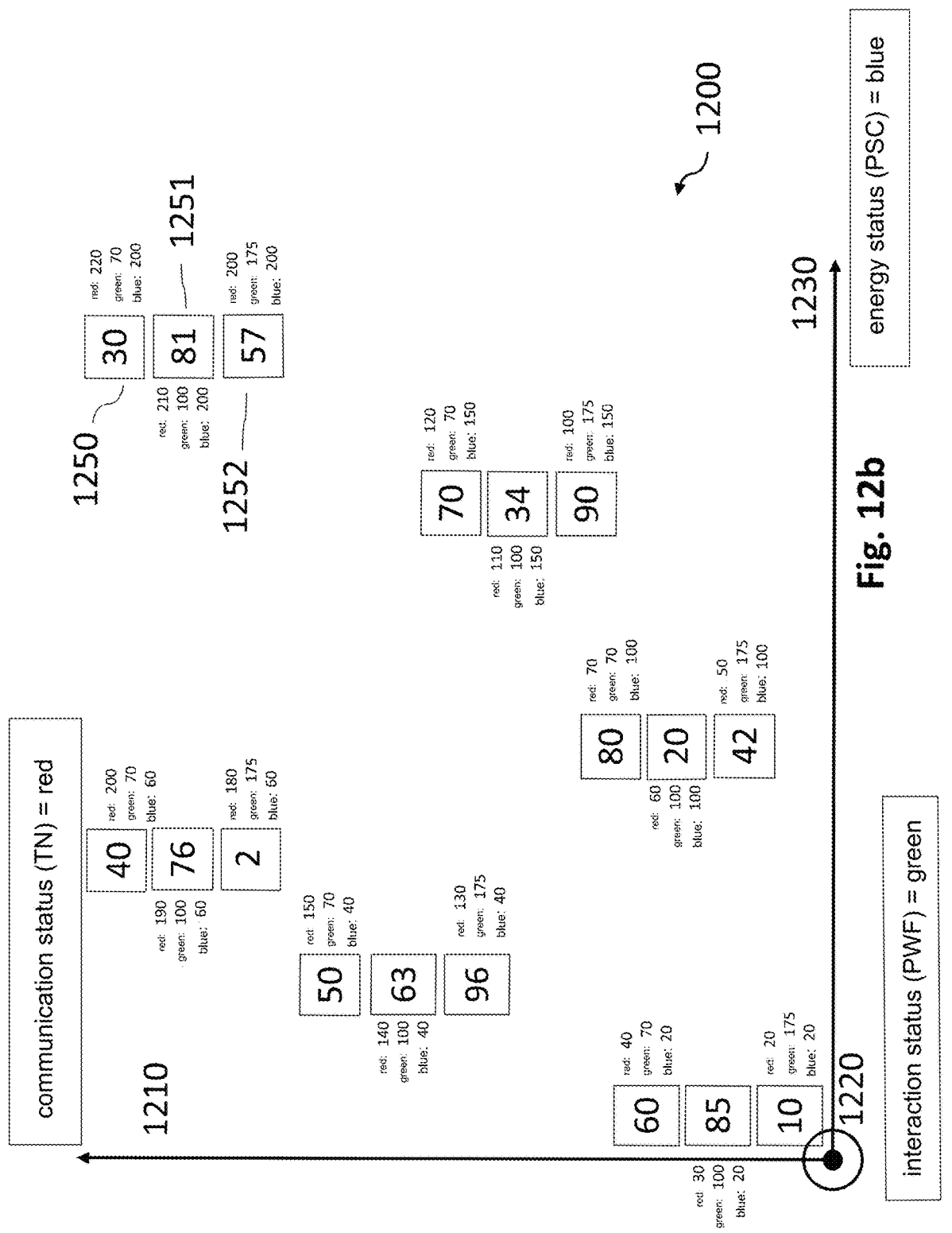
Figure 12C:
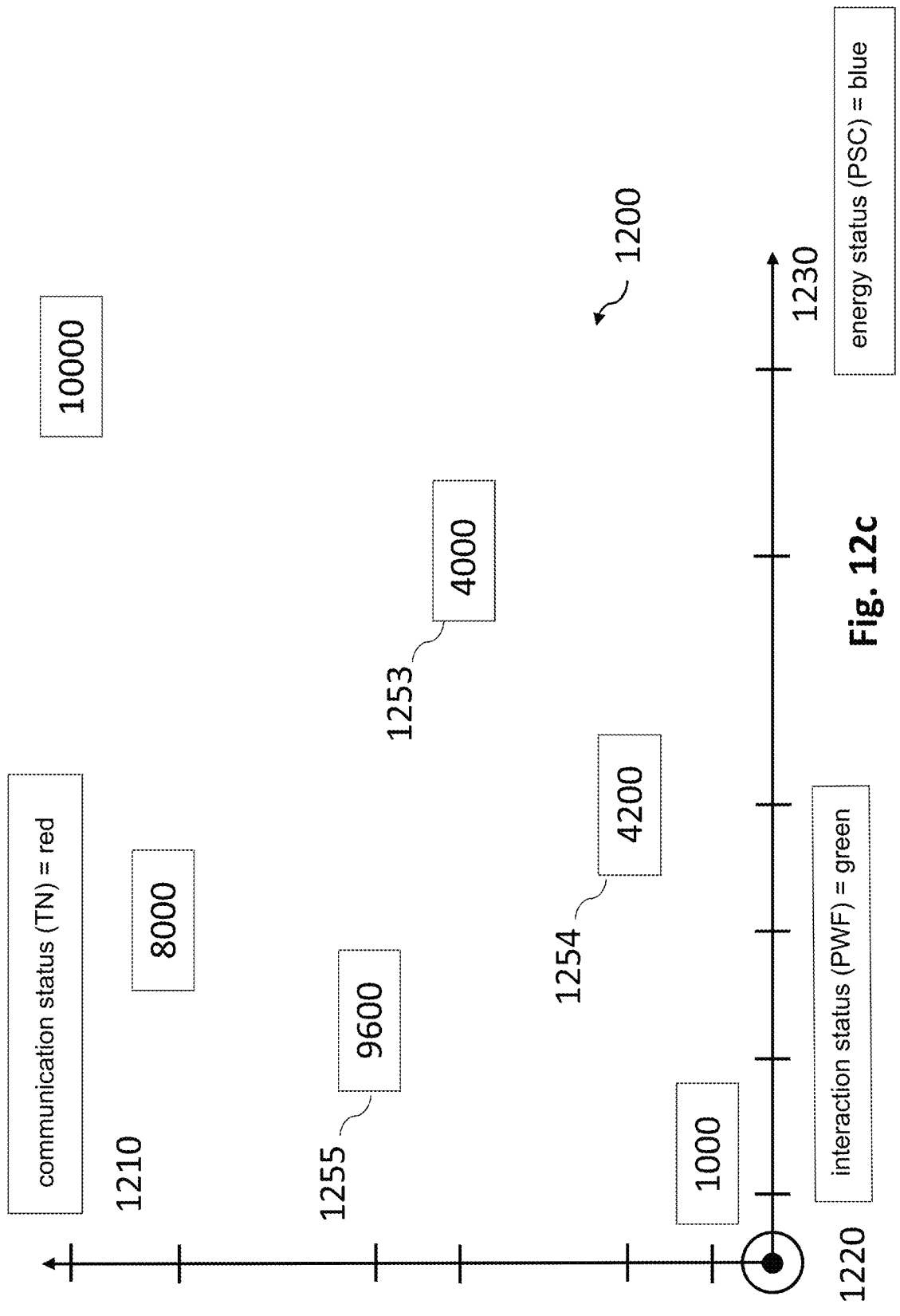
Figure 12D:
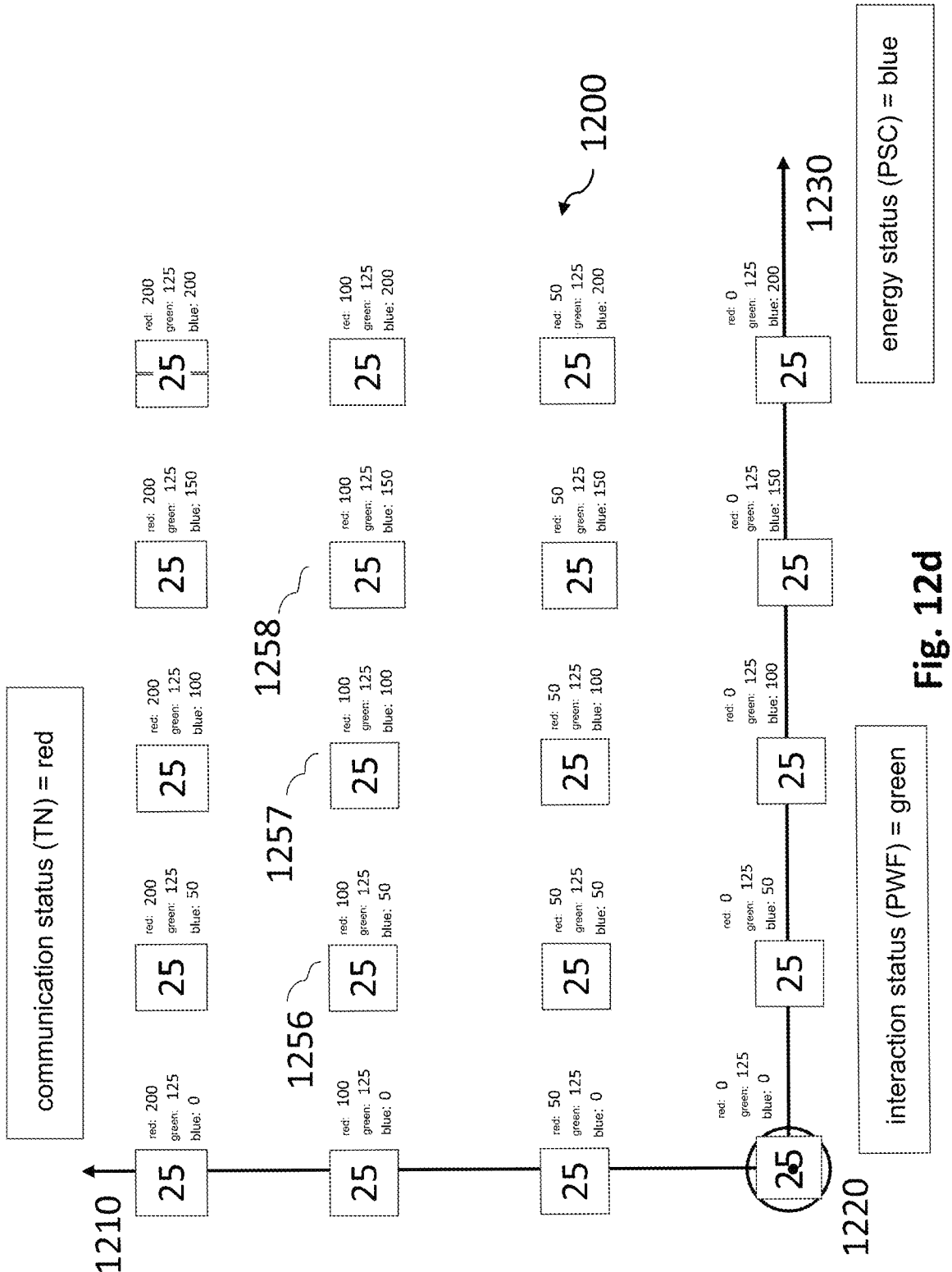

FIG. 12b, FIG. 12c and FIG. 12d show three further examples of the pixel image 1200, wherein for better clarity only one plane of the three-dimensional space is shown, for which an interaction status on the interaction status axis is constant. Multiple pixel values are displayed as pixels, e.g., pixels 1250, 1251, 1252 in FIG. 12b, pixels 1253, 1254, 1255 in FIG. 12c, and pixels 1256, 1257, 1258 in FIG. 12d. The pixel value indicates three numerical values for the communication status (red), the energy status (blue) and the interaction status (green) of a pixel. A time stamp is also associated with each pixel (entered in the pixel). The time stamp determines a relative point in time to which the status data represented by the pixels refer.

The pixel image 1200 in FIG. 12b and FIG. 12c shows a progression of a vehicle function over time. Each pixel indicates a communication status, energy status and interaction status of the vehicle function for a respective point in time.

Using the pixel image 1200, activated sub-functions of the vehicle function, a transition of the sub-functions and the temporal behavior of the vehicle function may therefore be checked. Image processing methods may be used to evaluate the pixel image 1200 and find faults in the course of the vehicle function. Troubleshooting may be carried out as a pixel search (e.g., as an image comparison). Transitions may be transformed into image sequences. By cleverly associating numerical values with the statuses, the pixels on the "communication status" 1210, "interaction status" 1220 and "energy status" 1230 axes may be arranged in such a way that they display additional diagnostic information about the system state. In other embodiments, each of the pixels may represent an active energy consumer. The pixel image 1200 may therefore be used at various system levels to check a vehicle function.

FIG. 12d shows an example of the pixel image 1200 for an on-board network status at a specific point in time. Each of the pixels may display a specific vehicle function, for example. For example, the on-board network status may be described as follows:

(green) Interaction status A: Interaction status (PWF) 125
(blue) Energy status 50 (PSC_ZF_Function-A)
(blue) Energy status 100 (PSC_ZF_Function-B for sub-network 1 (TN))
(blue) Energy status 150 (PSC_ZF_Function-C for TN 2)
(blue) Energy status 200 (PSC_ZF_Function-D for TN 3)
(red) Communication status A: 50 (sub-network TN_1)
(red) Communication status B: 100 (sub-network TN_2)
(red) Communication status C: 150 (sub-network TN_3)

An exemplary usage situation of the vehicle that causes the on-board network status shown in FIG. 12d may be as follows: A user is in the vehicle after driving the vehicle (=interaction status: living); the user is charging the vehicle's battery and has switched on the vehicle's radio, a fan is cooling the vehicle's engine and the air conditioning is active. The electrical system status may be described as follows:

Green 125=living
Blue 50=PSC_ZF_E fan
Blue 100=PSC_air conditioning_base
Blue 150=PSC_Entertainment mode
Blue 200=PSC_loading
Red 50=TN Air conditioning_base_on
Red 100=TN Entertainment mode_on
Red 200=TN Loading_on Using the pixel image 1200, an entire on-board network status and thus all active vehicle functions may therefore be monitored. A temporal behavior of the vehicle's on-board network status may also be evaluated, e.g., by creating a respective pixel image for different points in time and analyzing all resulting pixel images as an image sequence.

FIG. 13 shows an example of a diagnostic matrix 1300 that may create and evaluate a method described herein for checking a vehicle function of a vehicle based on status data of the vehicle. The diagnostic matrix 1300 lists an evaluation of status data for a respective point in time (relative time) in each line. Each line shows a respective interaction status (PWF), energy status (energy supply; PSC) and communication status of the vehicle together with their switching duration and frequency. In addition, the diagnostic matrix indicates 1300 status messages for the respective time and an energy balance.

Further embodiments relate to a control device for checking a vehicle function of a vehicle. For example, the control device may be configured to perform a method of activating the vehicle function, such as method 1000. The control device comprises a control circuit that is configured to receive status data to activate the vehicle function. The received status data indicates an identifier of the vehicle function, an identifier of an energy consumer of the plurality of energy consumers and an identifier of an energy path of the plurality of energy paths and is indicative of a provision of electrical energy to the energy consumer via the energy path to perform the vehicle function. The control circuit is further configured to check the vehicle function by comparing the status data with a target state of the vehicle function.

Further embodiments relate to a vehicle comprising a plurality of energy paths, a plurality of energy consumers and the above-mentioned control device for checking a vehicle function of the vehicle.

Further details and aspects of the control device or vehicle are explained in connection with the proposed technology or one or more examples described above, e.g., with reference to FIG. 10. The control device or the vehicle may comprise one or more additional optional features corresponding to one or more aspects of the proposed technique or one or more examples described above.

The proposed technology provides a method, a control device or a vehicle for checking a vehicle function based on an address chain of the vehicle function. The proposed technique for checking a vehicle function may increase a diagnostic capability for dynamic system activations in the operation of vehicle functions. It may enable monitoring the activation process of the vehicle function as well as the transitions when multiple vehicle functions or energy consumers are activated and, if necessary, make statements about the operating states of the respective systems. A system configuration (on-board network configuration) may be transformed into graphs or pixel images. For this purpose, an activation graph may be associated with each vehicle function based on the associated address chain in the database (registry). A node represents an energy consumer; the corresponding edges represent the affiliation to an address chain.

The proposed technology may improve a vehicle's conventional network management (e.g., using an Autosar environment). Conventional network management is usually "one-dimensional", i.e., only available for communication via data bus systems. The proposed technology may reduce a diagnostic effort even with increasing complexity of vehicle networks, high communication volume and different signals for interaction status, for power distribution units in the power supply cluster, for communication control and for power-only. The technology may also reduce a number of vehicle components that control communication or energy supply and make the vehicle functions more efficient by selectively activating parts of the overall system.

LIST OF REFERENCE NUMERALS 100 method
110 activating an energy path
120 receiving feedback
130 registering the identifier of the vehicle function
200 data set
201 first data field
202-205 further data fields
300 method
310 apparatus
320 energy consumer
400 database
500 method
600 method
610 receiving a command to activate a vehicle function
620 determining an identifier of an energy path
630 selectively activating an energy path
640 sending a command via a communication path
700 method
710 receiving a command to activate a vehicle function
715 determining an interaction status
720 determining an identifier of an energy path
730 selectively activating an energy path
731-733 driving a current distributor 1-3
740 sending a command via a communication path
741-741 driving a data bus system 1-3
800 method
820 determining an identifier of an energy path
825 initializing a network system
830 selectively activating an energy path
850 initializing an energy consumer
855 setting a standby mode
860 activating a communication path
862 activating a sensor
864 setting an operating mode
870 executing an overrun
880 determine whether overrun is completed
890 deactivating an energy path
900 method
910 apparatus
920 energy consumer
1000 method
1010 receiving status data
1020 checking the vehicle function
1100 graph
1110-1160 node
1200 pixel image
1210 communication status axis 1220 interaction status axis
1230 energy status axis
1240, 1242 three-dimensional structure
1250-1258 pixel
1300 diagnostic matrix

The invention claimed is:

1. A method of activating a vehicle function of a vehicle, wherein the vehicle comprises a plurality of energy paths and a plurality of energy consumers, each energy path of the plurality of energy paths comprising at least one energy consumer of the plurality of energy consumers, comprising:
receiving a command to activate the vehicle function;
wherein the command to activate the vehicle function specifies an identifier of the vehicle function;
in response to the command to activate the vehicle function, determining an identifier of an energy path of the plurality of energy paths associated with the identifier of the vehicle function; and
selectively activating the energy path to provide electrical energy to at least one energy consumer of the plurality of energy consumers,
wherein the energy consumer is configured to perform the vehicle function.

2. The method of claim 1,
wherein selectively activating the energy path comprises selecting the energy path according to the identifier of the energy path.

3. The method of claim 1, further comprising:
after selectively activating the energy path, receiving feedback indicative of a completed initialization of the energy consumer from a control of the energy consumer; and
sending a command to the control of the energy consumer to perform the vehicle function.

4. The method of claim 1, further comprising:
receiving a command to deactivate the vehicle function; and
in response to the command to deactivate the vehicle function, sending a command to a control of the energy consumer to shut down the energy consumer.

5. The method of claim 4, further comprising:
after sending the command to shut down the energy consumer, receiving feedback indicative of a completed shutdown of the energy consumer from the control; and
in response to the feedback from the control, deactivating the energy path.

6. The method of claim 1, further comprising:
receiving a command to deactivate the vehicle function; and
in response to the command to deactivate the vehicle function, determining whether the energy consumer performs another vehicle function of the vehicle; and
if it is determined that the energy consumer does not perform any other vehicle function, deactivating the energy path.

7. The method of claim 1,
wherein the identifier of the energy path is indicative of a current distributor connected to the energy path, and
wherein the selective activation of the energy path comprises driving the current distributor.

8. The method of claim 1, further comprising:
determining an identifier of a communication path of the vehicle associated with the identifier of the vehicle function; and
in response to the command to activate the vehicle function, sending a command to perform the vehicle function to a control of another energy consumer of the plurality of energy consumers connected to the communication path.

9. A control device for activating a vehicle function of a vehicle, wherein the vehicle comprises a plurality of energy paths and a plurality of energy consumers, each energy path of the plurality of energy paths comprising at least one energy consumer of the plurality of energy consumers, comprising:

a control circuit configured to:

receive a command to activate the vehicle function, the command to activate the vehicle function specifying an identifier of the vehicle function;

in response to the command to activate the vehicle function, determining an identifier of an energy path of the plurality of energy paths associated with the identifier of the vehicle function; and to selectively activate the energy path to provide electrical energy to at least one energy consumer of the plurality of energy consumers, wherein the energy consumer is configured to perform the vehicle function.

10. A vehicle, comprising:

a plurality of energy paths and a plurality of energy consumers, each energy path of the plurality of energy paths comprising at least one energy consumer of the plurality of energy consumers; and a control device for activating a vehicle function of the vehicle, comprising:

a control circuit configured to:

receive a command to activate the vehicle function, the command to activate the vehicle function specifying an identifier of the vehicle function;

in response to the command to activate the vehicle function, determining an identifier of an energy path of the plurality of energy paths associated with the identifier of the vehicle function; and to selectively activate the energy path to provide electrical energy to at least one energy consumer of the plurality of energy consumers, wherein the energy consumer is configured to perform the vehicle function.

* * * * *